(12) United States Patent
Hulse et al.

(10) Patent No.: US 12,195,664 B2
(45) Date of Patent: *Jan. 14, 2025

(54) COMPOSITIONS CONTAINING DIFLUOROMETHANE AND FLUORINE SUBSTITUTED OLEFINS

(71) Applicant: HONEYWELL INTERNATIONAL INC., Charlotte, NC (US)

(72) Inventors: Ryan Hulse, Charlotte, NC (US); Rajiv Ratna Singh, Charlotte, NC (US); Justin Becker, Charlotte, NC (US); Robert Gerard Richard, Charlotte, NC (US); Rajat S. Basu, Charlotte, NC (US); Hang T. Pham, Charlotte, NC (US); Ian Shankland, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,986

(22) Filed: Apr. 9, 2024

(65) Prior Publication Data

US 2024/0263060 A1 Aug. 8, 2024

Related U.S. Application Data

(60) Continuation of application No. 17/692,092, filed on Mar. 10, 2022, which is a division of application No. 17/065,173, filed on Oct. 7, 2020, now Pat. No. 11,306,235, which is a division of application No. 16/868,785, filed on May 7, 2020, now Pat. No. 11,214,720, which is a continuation of application No. 16/281,577, filed on Feb. 21, 2019, now Pat. No. 10,676,656, which is a continuation of application No. 16/051,765, filed on Aug. 1, 2018, now abandoned, which is a division of application No. 15/419,622, filed on Jan. 30, 2017, now abandoned, which is a division of application No. 12/511,954, filed on Jul. 29, 2009, now abandoned.

(60) Provisional application No. 61/099,382, filed on Sep. 23, 2008, provisional application No. 61/084,997, filed on Jul. 30, 2008.

(51) Int. Cl.
C09K 5/04 (2006.01)
F25B 9/00 (2006.01)

(52) U.S. Cl.
CPC ............... *C09K 5/045* (2013.01); *F25B 9/00* (2013.01); *C09K 2205/122* (2013.01); *C09K 2205/126* (2013.01); *C09K 2205/22* (2013.01); *C09K 2205/40* (2013.01)

(58) Field of Classification Search
CPC ............. C09K 5/045; C09K 2205/122; C09K 2205/126; C09K 2205/22; C09K 2205/40; F25B 9/00

See application file for complete search history.

(56) References Cited

U.S. PATENT DOCUMENTS

| | | | |
|---|---|---|---|
| 6,971,244 B2 | 12/2005 | Domyo | |
| 8,444,874 B2 | 5/2013 | Singh | |
| 9,133,379 B2 | 9/2015 | Rached | |
| 10,676,656 B2 * | 6/2020 | Hulse | C09K 5/045 |
| 11,214,720 B2 * | 1/2022 | Hulse | C09K 5/045 |
| 11,306,235 B2 * | 4/2022 | Hulse | C09K 5/045 |
| 2006/0243944 A1 * | 11/2006 | Minor | A62D 1/0057 |
| | | | 252/67 |
| 2006/0243945 A1 | 11/2006 | Minor | |
| 2008/0121837 A1 | 5/2008 | Singh | |
| 2009/0314015 A1 | 12/2009 | Minor | |

FOREIGN PATENT DOCUMENTS

| | | |
|---|---|---|
| CN | 1732243 A | 2/2006 |
| EP | 2246649 | 11/2010 |
| JP | H04110388 | 4/1992 |
| WO | 2004037913 A2 | 5/2004 |
| WO | 2006094303 | 9/2006 |
| WO | 2007144623 | 12/2007 |
| WO | 2008009928 | 1/2008 |
| WO | 2008027555 A2 | 3/2008 |
| WO | 20100201000240928 | 1/2010 |
| WO | 2010040928 | 4/2010 |

* cited by examiner

*Primary Examiner* — Amina S Khan
(74) *Attorney, Agent, or Firm* — FisherBroyles, LLP; Joseph F. Posillico

(57) ABSTRACT

Compositions comprising multi-fluorinated olefins and HFC-32 are disclosed. Such compositions are useful particularly for in stationary refrigeration and air conditioning equipment.

30 Claims, 12 Drawing Sheets

COMPOSITIONS CONTAINING DIFLUOROMETHANE AND FLUORINE SUBSTITUTED OLEFINS

RELATED APPLICATIONS

The present application is a continuation of U.S. application Ser. No. 17/692,092, filed Mar. 10, 2022, which is a division of U.S. application Ser. No. 17/065,173, filed Oct. 7, 2020 (now U.S. Pat. No. 11,306,235, issued Apr. 19, 2022) which is a division of U.S. application Ser. No. 16/868,785, filed May 7, 2020 (now U.S. Pat. No. 11,214,720, issued Jan. 4, 2022), which application is a continuation of U.S. application Ser. No. 16/281,577, filed Feb. 21, 2019 (now U.S. Pat. No. 10,676,656, issued Jun. 9, 2020), which application is a continuation of Ser. No. 16/051,765, filed Aug. 1, 2018 (now abandoned), which application is a division of U.S. application Ser. No. 15/419,622, filed Jan. 30, 2017 (now abandoned), which application is a division of U.S. application Ser. No. 12/511,954, filed Jul. 29, 2009, (now abandoned), which claims the benefit of Provisional Application No. 61/099,382, filed Sep. 23, 2008 and the benefit of Provisional Application No. 61/084,997, filed on Jul. 30, 2008. Each of the applications identified in this paragraph are incorporated herein by reference as is fully set forth below.

FIELD OF THE INVENTION

This invention relates to compositions, methods and systems having utility in numerous applications, including particularly heat transfer systems such as refrigeration systems. In preferred aspects, the present invention is directed to refrigerant compositions which comprise difluoromethane and at least one multi-fluorinated olefin and/or at least one fluoroiodocarbon, and to the preferred use of such compositions in stationary refrigeration and air conditioning equipment.

BACKGROUND

Fluorocarbon based fluids have found widespread use in many commercial and industrial applications, including as the working fluid in systems such as air conditioning, heat pump and refrigeration systems, among other uses such as aerosol propellants, as blowing agents, and as gaseous dielectrics.

Heat transfer fluids, to be commercially viable, must satisfy certain very specific and in certain cases very stringent combinations of physical, chemical and economic properties. Moreover, there are many different types of heat transfer systems and heat transfer equipment, and in many cases it is important that the heat transfer fluid used in such systems possess a particular combination of properties that match the needs of the individual system. For example, systems based on the vapor compression cycle usually involve the phase change of the refrigerant from the liquid to the vapor phase through heat absorption at a relatively low pressure and compressing the vapor to a relatively elevated pressure, condensing the vapor to the liquid phase through heat removal at this relatively elevated pressure and temperature, and then reducing the pressure to start the cycle over again.

For example, certain fluorocarbons have been a preferred component in many heat exchange fluids, such as refrigerants, for many years in many applications. Fluoroalkanes, such as chlorofluoromethanes and chlorofluoroethanes, have gained widespread use as refrigerants in applications including air conditioning and heat pump applications owing to their unique combination of chemical and physical properties, such as heat capacity, flammability, stability under the conditions of operation, and miscibility with the lubricant (if any) used in the system. Moreover, many of the refrigerants commonly utilized in vapor compression systems are either single components fluids, or zeotropic, azeotropic mixtures.

Concern has increased in recent years about potential damage to the earth's atmosphere and climate, and certain chlorine-based compounds have been identified as particularly problematic in this regard. The use of chlorine-containing compositions (such as chlorofluorocarbons (CFCs), hydrochlorofluorocarbons (HCFCs) and the like) as refrigerants in air-conditioning and refrigeration systems has become disfavored because of the ozone-depleting properties associated with many of such compounds. There has thus been an increasing need for new fluorocarbon and hydrofluorocarbon compounds that offer alternatives for refrigeration and heat pump applications. For example, it has become desirable to retrofit chlorine-containing refrigeration systems by replacing chlorine-containing refrigerants with non-chlorine-containing refrigerant compounds that will not deplete the ozone layer, such as hydrofluorocarbons (HFCs).

Another concern surrounding many existing refrigerants is the tendency of many such products to cause global warming. This characteristic is commonly measured as global warming potential (GWP). The GWP of a compound is a measure of the potential contribution to the green house effect of the chemical against a known reference molecule, namely, $CO_2$ which has a GWP=1. For example, the following known refrigerants possess the following Global Warming Potentials:

| REFRIGERANT | GWP |
| --- | --- |
| R410A | 1975 |
| R-507 | 3850 |
| R404A | 3784 |
| R407C | 1653 |

While each of the above-noted refrigerants has proven effective in many respects, these materials are become increasingly less preferred since it is frequently undesirable to use materials having GWPs greater than about 1000. A need exists, therefore, for substitutes for these and other existing refrigerants having undesirable GWPs.

There has thus been an increasing need for new fluorocarbon and hydrofluorocarbon compounds and compositions that are attractive alternatives to the compositions heretofore used in these and other applications. For example, it has become desirable to retrofit certain systems, including chlorine-containing and certain HFC-containing refrigeration systems by replacing the existing refrigerants with refrigerant compositions that will not deplete the ozone layer, will not cause unwanted levels of global worming, and at the same time will satisfy all of the other stringent requirements of such systems for the materials used as the heat transfer material.

With respect to performance properties, the present applicants have come to appreciate that that any potential substitute refrigerant must also possess those properties present in many of the most widely used fluids, such as excellent heat transfer properties, chemical stability, low- or no-toxicity, low or non-flammability and lubricant compatibility, among others.

With regard to efficiency in use, it is important to note that a loss in refrigerant thermodynamic performance or energy efficiency may have secondary environmental impacts through increased fossil fuel usage arising from an increased demand for electrical energy.

Furthermore, it is generally considered desirable for refrigerant substitutes to be effective without major engineering changes to conventional vapor compression technology currently used with existing refrigerants, such as CFC-containing refrigerants.

Applicants have thus come to appreciate a need for compositions, and particularly heat transfer compositions, that are potentially useful in numerous applications, including vapor compression heating and cooling systems and methods, while avoiding one or more of the disadvantages noted above.

Applicants have also come to appreciate that lubricant compatibility is of particular importance in many of applications. More particularly, it is highly desirably for refrigeration fluids to be compatible with the lubricant utilized in the compressor unit, used in most refrigeration systems. Unfortunately, many non-chlorine-containing refrigeration fluids, including HFC's, are relatively insoluble and/or immiscible in the types of lubricants used traditionally with CFC's and HFC's, including, for example, mineral oils, alkylbenzenes or poly(alpha-olefins). In order for a refrigeration fluid-lubricant combination to work at a desirable level of efficiently within a compression refrigeration, air-conditioning and/or heat pump system, the lubricant should be sufficiently soluble in the refrigeration liquid over a wide range of operating temperatures. Such solubility lowers the viscosity of the lubricant and allows it to flow more easily throughout the system. In the absence of such solubility, lubricants tend to become lodged in the coils of the evaporator of the refrigeration, air-conditioning or heat pump system, as well as other parts of the system, and thus reduce the system performance.

Flammability is another important property for many applications. That is, it is considered either important or essential in many applications, including particularly in heat transfer applications, to use compositions which are non-flammable or of relatively low flammability. As used herein, the term "nonflammable" refers to compounds or compositions which are determined to be nonflammable as determined in accordance with ASTM standard E-681, dated 2002, which is incorporated herein by reference. Unfortunately, many HFC's which might otherwise be desirable for used in refrigerant compositions are not nonflammable. For example, the fluoroalkane difluoroethane (HFC-152a) and the fluoroalkene 1,1,1-trifluorpropene (HFO-1243zf) are each flammable and therefore not viable for use alone in many applications.

Higher fluoroalkenes, that is fluorine-substituted alkenes having at least five carbon atoms, have been suggested for use as refrigerants. U.S. Pat. No. 4,788,352—Smutny is directed to production of fluorinated C5 to C8 compounds having at least some degree of unsaturation. The Smutny patent identifies such higher olefins as being known to have utility as refrigerants, pesticides, dielectric fluids, heat transfer fluids, solvents, and intermediates in various chemical reactions. (See column 1, lines 11-22).

While the fluorinated olefins described in Smutny may have some level of effectiveness in heat transfer applications, it is believed that such compounds may also have certain disadvantages. For example, some of these compounds may tend to attack substrates, particularly general-purpose plastics such as acrylic resins and ABS resins. Furthermore, the higher olefinic compounds described in Smutny may also be undesirable in certain applications because of the potential level of toxicity of such compounds which may arise as a result of pesticide activity noted in Smutny. Also, such compounds may have a boiling point which is too high to make them useful as a refrigerant in certain applications.

SUMMARY

According to one aspect of the present invention, applicants have found that one or more of the above-noted needs, and possibly other needs, can be satisfied by compositions, preferably heat transfer compositions, and even more preferably heat transfer compositions and systems comprising, and in certain preferred embodiments consisting essentially of, difluoromethane (R-32) and at least one second component selected from C2-C5 multifluorinated olefins, preferably comprising at least one C3-C5 tetra- or penta-fluorinated olefin, and even more preferably at least one tetrafluoropropene. In highly preferred embodiments of this aspect of the invention, the at least one C3-C5 multifluorinated olefin comprises, and in certain embodiments consists essentially of, one or more compounds having a terminal –CF3 moitey and an unsaturated terminal carbon having at not more than one fluorine substituent. In highly preferred embodiments, the present compositions comprise, and the present method use difluoromethane (R-32) and 1,1,1,3-tetrafluoropropene (HFO-1234ze, including all isomers) and/or 1,1,1,2-tetrafluoropropene (HFO-1234yf) and/or 1,2,3,3,3-pentafluoropropene (HFO 1225ye).

For embodiments of the present invention in which the multifluorinated compound has at least one Br substituent present, it is preferred that the compound includes no hydrogen. In such embodiments it also generally preferred that the Br substituent is on an unsaturated carbon, and even more preferably the Br substituent is on an non-terminal unsaturated carbon. One embodiment in this class is CF3CBr=CF2, including all of its isomers.

In certain embodiments, the compositions further comprise at least a third component selected from C2-C3 fluorinated alkanes, CF3I, and combinations of these. As used herein, the term "fluorinated C2-C3 alkanes" means alkanes having 2 or 3 carbon atoms and at least one fluorine substituent. In certain preferred embodiments of this aspect of the invention, the second and/or third components act as a flammability reducing agent. As used herein, the term flammability reducing agent refers to a compound or combination of compounds having the net effect of reducing the flammability of the composition relative to the flammability of difluoromethane alone. In certain preferred embodiments, the third component is selected from the group consisting of fluorinated ethanes.

The term "HFO-1234" is used herein to refer to all tetrafluoropropenes. Among the tetrafluoropropenes are included 1,1,1,2-tetrafluoropropene (HFO-1234yf) and both cis- and trans-1, 1, 1, 3-tetrafluoropropene (HFO-1234ze). The term HFO-1234ze is used herein generically to refer to 1, 1, 1, 3-tetrafluoropropene, independent of whether it is the cis- or trans-form. The terms "cisHFO-1234ze" and "transHFO-1234ze" are used herein to describe the cis- and trans-forms of 1, 1, 1, 3-tetrafluoropropene respectively. The term "HFO-1234ze" therefore includes within its scope cisHFO-1234ze, transHFO-1234ze, and all combinations and mixtures of these.

The present invention provides also methods and systems which utilize the compositions of the present invention, including methods and systems for transferring heat, and methods and systems for replacing an existing heat transfer fluid in an existing heat transfer system, and methods of selecting a heat transfer fluid in accordance with the present invention to replace one or more existing heat transfer fluids. In preferred embodiments, the methods and systems for selecting a replacement heat transfer fluid comprise selecting a heat transfer fluid to replace one or more of the following heat transfer fluids in an existing heat transfer system: R-22, R-134a, R-404A, R-407C, R410A, R-507, and combinations of any two or more of these.

DETAILED DESCRIPTION OF PREFERRED EMBODIMENTS

The Compositions

Figure 1:
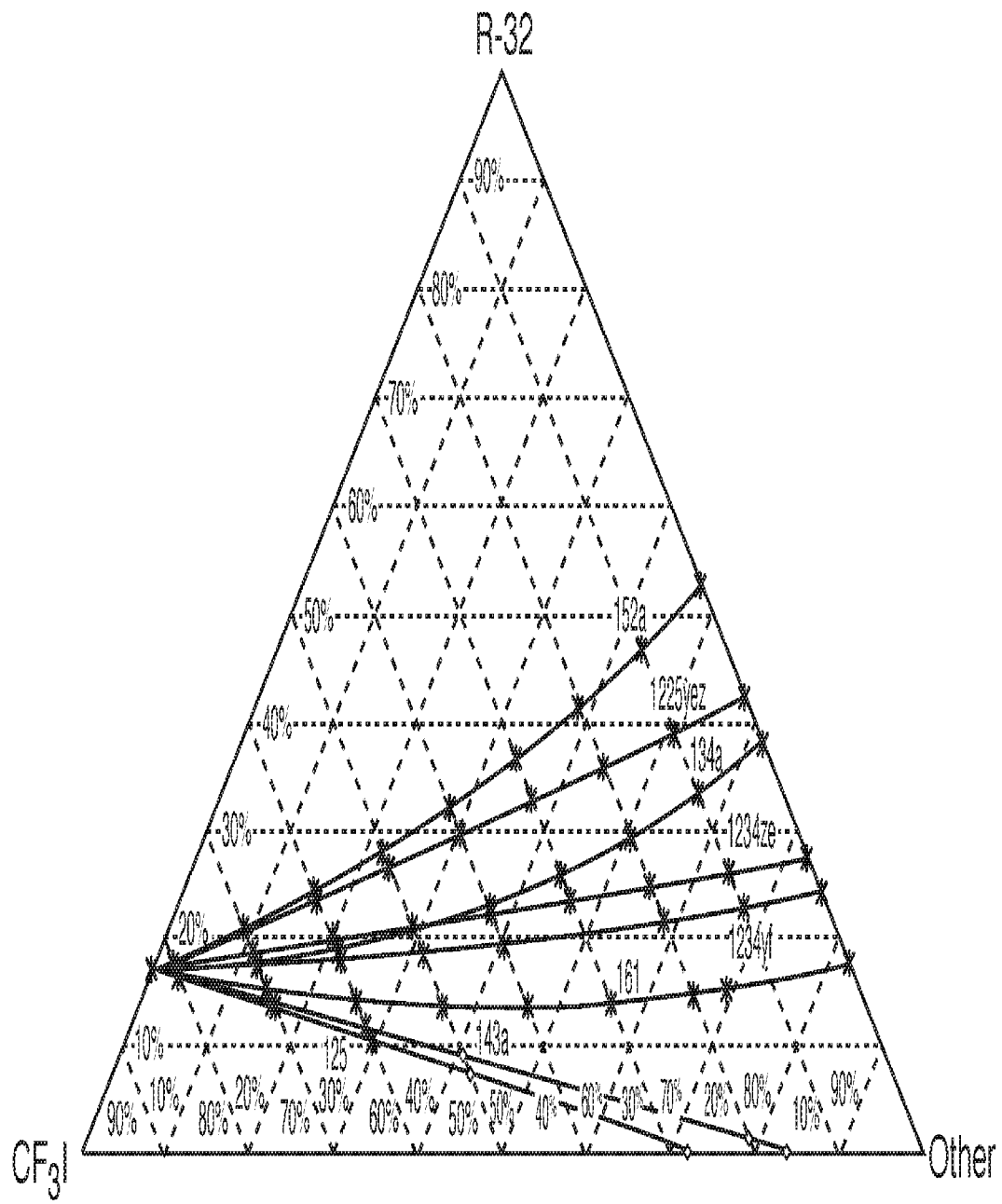
FIGS. 1-12 are ternary composition curves which also show binary compositions for certain preferred compositions of the present invention at various concentrations of each component for which the capacity substantially matches a known refrigerant, as described in the Examples hereof.

One of the advantages of certain embodiments of the present invention is the provision of compositions having exceptional flammability properties while retaining other important properties in the desirable range. Applicants have come to appreciate that both R-32 and HFO-1234yf have measurable flame limits at room temperature. However, applicants note that the flame hazard of the compounds in the present compositions compares favorably to other HFCs such as R-152a and HCs such as R-290. One way of ranking the flammability of these material is to measure the flame speed of each compound. The maximum flame speed of R-32, R-152a and R-290 have been reported (Jabbour) to be 6.7, 23.0 and 38.5 cm/s, respectively. The flame speed of HFO-1234yf has been measured to be 1.5 cm/s. The flame speed measurements are designed to be measured at room temperature. Since HFO-1234ze(E) is non-flammable at room temperature the flame speed cannot be directly compared to the other values but it is reasonable to expect that the flame speed of HFO-1234ze(E) is less than the flame speed of HFO-1234yf. This would mean that all mixtures of R-32 and HFO-1234ze and/or HFO-1234yf would have a flame speed of less than 6.7 cm/s. In comparing different materials, if a first material has a lower flame speed than a second material, then the first material will have a lower likelihood of stable flame propagation relative to the second material.

In preferred embodiments, the at least one multi-fluorinated olefin compound of the present compositions include compounds of Formula I below:

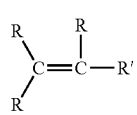
(I)

where each R is independently Cl, F, Br, I or H,
R' is (CR$_2$)$_n$Y,
Y is CRF$_2$
and n is 0, 1, 2 or 3, preferably 0 or 1, it being generally preferred however that when Br is present in the compound there is no hydrogen in the compound. In certain embodiments, Br is not present in the compound.

In highly preferred embodiments, Y is CF3, n is 0 or 1 (most preferably 0) and at least one of the remaining Rs, including the Rs in R' is F, and preferably no R is Br or when Br is present, there is no hydrogen in the compound.

Applicants believe that, in general, the compounds of the above identified Formulas I are generally effective and exhibit utility in heat transfer compositions generally and in refrigerant compositions particularly. The compositions of the present invention also find use as blowing agent compositions, compatibilzers, aerosols, propellants, fragrances, flavor formulations, solvent compositions and inflating agent composition. However, applicants have surprisingly and unexpectedly found that certain of the compounds having a structure in accordance with the formulas described above exhibit a highly desirable low level of toxicity compared to other of such compounds. As can be readily appreciated, this discovery is of potentially enormous advantage and benefit for the formulation of not only refrigerant compositions, but also any and all compositions which would otherwise contain relatively toxic compounds satisfying the formulas described above. More particularly, applicants believe that a relatively low toxicity level is associated with compounds of Formula II, preferably wherein Y is CF3, n is 0 or 1, wherein at least one R on the unsaturated terminal carbon is H, and at least one of the remaining Rs is F or Cl. Applicants believe also that all structural, geometric and stereoisomers of such compounds are effective and of beneficially low toxicity.

In certain preferred embodiments, the multi-fluorinated compound of the present invention comprises a C3 or C4 hydrofluorochlorooolefin ("HFCO"), preferably a C3 HFCO, and more preferably a compound in accordance with Formula I in which Y is CF3, n is 0, at least one R on the unsaturated terminal carbon is H, and at least one of the remaining Rs is Cl. HFCO-1233 is an example of such a preferred compound.

In highly preferred embodiments, especially embodiments which comprise the low toxicity compounds described above, n is zero. In certain highly preferred embodiments the compositions of the present invention comprise one or more tetrafluoropropenes, including HFO-1234yf, (cis)HFO-1234ze and (trans)HFO-1234ze, and combinations of two or more of these. Although the properties of (cis)HFO-1234ze and (trans)HFO-1234ze differ in at least some respects, it is contemplated that each of these compounds is adaptable for use, either alone or together with other compounds including its stereo isomer, in connection with each of the applications, methods and systems described herein. For example, (trans)HFO-1234ze may be preferred for use in certain systems because of its relatively low boiling point (−19° C.), while (cis)HFO-1234ze, with a boiling point of +9° C., may be preferred in other applications. Of course, it is likely that combinations of the cis- and trans-isomers will be acceptable and/or preferred in many embodiments. Accordingly, it is to be understood that the terms "HFO-1234ze" and 1, 3, 3, 3-tetrafluoropropene refer to either or both stereo isomers, and the use of this term is intended to indicate that each of the cis- and trans-forms applies and/or is useful for the stated purpose unless otherwise indicated.

HFO-1234 compounds are known materials and are listed in Chemical Abstracts databases. The production of fluoropropenes such as CF3CH=CH2 by catalytic vapor phase fluorination of various saturated and unsaturated halogencontaining C3 compounds is described in U.S. Pat. Nos. 2,889,379; 4,798,818 and 4,465,786, each of which is incorporated herein by reference. EP 974,571, also incorporated herein by reference, discloses the preparation of 1,1,1,3-tetrafluoropropene by contacting 1,1,1,3,3-pentafluoropropane (HFC-245fa) in the vapor phase with a chromium-based catalyst at elevated temperature, or in the liquid phase with an alcoholic solution of KOH, NaOH, Ca(OH)2 or Mg(OH)2. In addition, methods for producing compounds in accordance with the present invention are described generally in connection with pending United States Patent Application entitled "Process for Producing Fluorpropenes" bearing U.S. application Ser. No. 10/694,272, which is also incorporated herein by reference.

Other preferred compounds for use in accordance with the present invention include pentafluoropropenes, including all isomers thereof (eg., HFO-1225), tetra- and penta-fluorobutenes, including all isomers thereof (eg., HFO-1354 and HFO-1345). Of course, the present compositions may comprise combinations of any two or more compounds within the broad scope of the invention or within any preferred scope of the invention.

The present compositions, particularly those comprising HFO-1234 (including HFO-1234ze and HFO-1234yf), are believed to possess properties that are advantageous for a number of important reasons. For example, applicants believe, based at least in part on mathematical modeling, that the fluoroolefins of the present invention will not have a substantial negative affect on atmospheric chemistry, being negligible contributors to ozone depletion in comparison to some other halogenated species. The preferred compositions of the present invention thus have the advantage of not contributing substantially to ozone depletion. The preferred compositions also do not contribute substantially to global warming compared to many of the hydrofluoroalkanes presently in use.

Of course other compounds and/or components that modulate a particular property of the compositions (such as cost for example) may also be included in the present compositions, and the presence of all such compounds and components is within the broad scope of the invention.

In certain preferred forms, compositions of the present invention have a Global Warming Potential (GWP) of not greater than about 1000, more preferably not greater than about 500, and even more preferably not greater than about 150. In certain embodiments, the GWP of the present compositions is not greater than about 100 and even more preferably not greater than about 75. As used herein, "GWP" is measured relative to that of carbon dioxide and over a 100 year time horizon, as defined in "The Scientific Assessment of Ozone Depletion, 2002, a report of the World Meteorological Association's Global Ozone Research and Monitoring Project," which is incorporated herein by reference.

In certain preferred forms, the present compositions also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

The amount of the multifluorinated olefins, particularly Formula I compounds, and even more particularly HFO-1234 compounds, contained in the present compositions can vary widely, depending the particular application, and compositions containing more than trace amounts and less than 100% of the compound are within broad the scope of the present invention. Moreover, the compositions of the present invention can be azeotropic, azeotrope-like or non-azeotropic. In preferred embodiments, the present compositions comprise Formula I compounds, preferably HFO-1234 and more preferably HFO-1234ze and/or HFO-1234yf, preferably HFO-1234ze and/or HFO-1234yf, in amounts from about 5% by weight to about 99% by weight, and even more preferably from about 5% to about 95%. Many additional compounds or components, including lubricants, stabilizers, metal passivators, corrosion inhibitors, flammability suppressants, and other compounds and/or components that modulate a particular property of the compositions (such as cost for example) may be included in the present compositions, and the presence of all such compounds and components is within the broad scope of the invention.

It is contemplated that the amount of HFC-32 present may vary widely within the broad scope of the present invention. In preferred embodiments, the amount of HFC-32 present in the composition is selected based on the desired heat transfer capacity of the fluid, based typically on the system in which the fluid will be used or is present. For embodiments in which the composition is used or intended for use in a system originally designed for use with one or more of R-22, R-134a, R-404A, R-407C, R-410A, R-507 (hereinafter referred to for purposes of convenience but not by way of limitation as the "existing refrigerant group"), the difluoromethane is preferably present in the composition in an amount of from about 1 wt % to about 95 wt %, more preferably from about 1 wt % to about 80 wt %, even more preferably from about 3 wt % to about 75 wt %, and even more preferably form about 5 wt % to about 70 wt %.

In certain preferred embodiments, the first component further comprises, in addition to R-32, C02, preferably in amounts of not greater than about 5 wt % of the composition.

The second component of the present compositions may also vary widely within the broad scope of the present invention. In preferred embodiments, the particular second component and its amount in the composition are selected based on the ability to reduce the flammability of the overall composition. For embodiments in which the composition is used or intended for use in a system originally designed for use with one or more of the refrigerants in the existing refrigerant group, the second component is preferably present in the composition in an amount of from about 5 to about 99 percent by weight of the composition. In other preferred embodiments, the second component is present in amounts for from about 20 to about 95 percent by weight of the composition.

For those embodiments according the second aspect having a third component, the amount of the third component may also vary widely within the broad scope of the present invention. In preferred embodiments, the amount of the third component present in the composition is also selected based on the desired heat transfer properties, particularly and preferably the heat capacity, of the composition, and all such amounts are within the scope of the present invention. The third component of the present invention in certain preferred embodiments is present in the heat transfer composition in amounts of from about 1 to about 99 percent by weight of the composition. As mentioned above, the third component when present is preferably a fluorinated ethane, preferably monofluoroethane (HFC-161), difluoroethane (HFC-152a), trifluoroethane (HFC-143a), 1,1,1,2-tetrafluoroethane (HFC-134a), and pentafluoroethane (HFC-125).

Accordingly, applicants have recognized that certain compositions of the present invention can be used to great advantage in a number of applications. For example, included in the present invention are methods and compositions relating to heat transfer applications, foam and blowing agent applications, propellant applications, sprayable composition applications, sterilization applications, aerosol applications, compatibilizer application, fragrance and flavor applications, solvent applications, cleaning applications, inflating agent applications and others. It is believed that those of skill in the art will be readily able to adapt the present compositions for use in any and all such applications without undue experimentation.

Heat Transfer Compositions

The compositions of the present invention are generally adaptable for use in heat transfer applications, that is, as a heating and/or cooling medium, including as evaporative cooling agents.

In connection with evaporative cooling applications, the compositions of the present invention are brought in contact, either directly or indirectly, with a body to be cooled and thereafter permitted to evaporate or boil while in such contact, with the preferred result that the boiling gas in accordance with the present composition absorbs heat from the body to be cooled. In such applications it may be preferred to utilize the compositions of the present invention, preferably in liquid form, by spraying or otherwise applying the liquid to the body to be cooled. In other evaporative cooling applications, it may be preferred to permit a liquid composition in accordance with the present intention to escape from a relatively high pressure container into a relatively lower pressure environment wherein the body to be cooled is in contact, either directly or indirectly, with the container enclosing the liquid composition of the present invention, preferably without recovering or recompressing the escaped gas. One particular application for this type of embodiment is the self cooling of a beverage, food item, novelty item or the like. Previous to the invention described herein, prior compositions, such as HFC-152a and HFC-134a were used for such applications. However, such compositions have recently been looked upon negatively in such application because of the negative environmental impact caused by release of these materials into the atmosphere. For example, the United States EPA has determined that the use of such prior chemicals in this application is unacceptable due to the high global warming nature of these chemicals and the resulting detrimental effect on the environment that may result from their use. The compositions of the present invention should have a distinct advantage in this regard due to their low global warming potential and low ozone depletion potential, as described herein. Additionally, the present compositions are expected to also find substantial utility in connection with the cooling of electrical or electronic components, either during manufacture or during accelerated lifetime testing. In a accelerated lifetime testing, the component is sequentially heated and cooled in rapid succession to simulate the use of the component. Such uses would therefore be of particular advantage in the semiconductor and computer board manufacturing industry. Another advantage of the present compositions in this regard is they are expected to exhibit as contagious electrical properties when used in connection with such applications. Another evaporative cooling application comprises methods for temporarily causing a discontinuation of the flow of fluid through a conduit. Preferably, such methods would include contacting the conduit, such as a water pipe through which water is flowing, with a liquid composition according to the present invention and allowing the liquid composition of the present invention to evaporate while in contact with the conduit so as to freeze liquid contained therein and thereby temporarily stop the flow of fluid through the conduit. Such methods have distinct advantage in connection with enabling the service or other work to be performed on such conduits, or systems connected to such conduits, at a location downstream of the location at which the present composition is applied.

Although it is contemplated that the compositions of the present invention may include the compounds of the present invention in widely ranging amounts, it is generally preferred that refrigerant compositions of the present invention comprise compound(s) in accordance with Formula I, and even more preferably HFO-1234 (including HFO-1234ze and HFO-1234yf), in an amount that is at least about 50% by weight, and even more preferably at least about 70% by weight, of the composition. In certain embodiments, it is preferred that the heat transfer compositions of the present invention comprise transHFO-1234ze. In certain preferred embodiments, it is preferred that the heat transfer compositions of the present invention comprise at least about 80%, and even more preferably at least about 90% by weight of HFO-1234, and even more preferably HFO-1234yf and/or HFO-1234ze. The heat transfer compositions of the present invention comprise in certain embodiments a combination of cisHFO-1234ze and transHFO1234ze, preferably in a cis:trans weight ratio of from about 1:99 to about 10:99, more preferably from about 1:99 to about 5:95, and even more preferably from about 1:99 to about 3:97.

The relative amount of the hydrofluoroolefin used in accordance with the present invention is preferably selected to produce a heat transfer fluid which has the required heat transfer capacity, particularly refrigeration capacity, and preferably is at the same time non-flammable. As used herein, the term non-flammable refers to a fluid which is non-flammable in all proportions in air as measured by ASTM E-681.

The compositions of the present invention may include other components for the purpose of enhancing or providing certain functionality to the composition, or in some cases to reduce the cost of the composition. For example, refrigerant compositions according to the present invention, especially those used in vapor compression systems, include a lubricant, generally in amounts of from about 30 to about 50 percent by weight of the composition. Furthermore, the present compositions may also include a co-refrigerant, or compatibilizer, such as propane, for the purpose of aiding compatibility and/or solubility of the lubricant. Such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs), PAG oils, silicone oil, mineral oil, alkyl benzenes (ABs) and poly(alpha-olefin) (PAO) that are used in refrigeration machinery with hydrofluorocarbon (HFC) refrigerants may be used with the refrigerant compositions of the present invention. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils are have sufficient solubility with the refrigerant that is comprised of an iodocarbon, the combination of the iodocarbon and the hydrocarbon oil might more stable than other types of lubricant. Such combination may therefore be advantageous. Preferred lubricants include polyalkylene glycols and esters. Polyalkylene glycols are highly preferred in certain embodiments because they are currently in use in particular applications such as mobile air-conditioning. Of course, different mixtures of different types of lubricants may be used.

In certain preferred embodiments, the heat transfer composition comprises from about 10% to about 95% by weight of a compound of Formula I, more preferably one or more HFO-1234 compounds, and from about 5% to about 90% by weight R-32.

The present methods, systems and compositions are thus adaptable for use in connection with a wide variety of heat transfer systems in general and refrigeration systems in particular, such as air-conditioning (including both stationary and mobile air conditioning systems), refrigeration, heat-pump systems, and the like. In certain preferred embodiments, the compositions of the present invention are used in stationary refrigeration systems, such as stationary air conditioning units and stationary refrigeration originally designed for use one or more of R-22, R-134a, R-404A, R-407C, R-410A, R-507. The preferred compositions of the present invention tend to exhibit many of the desirable characteristics of these existing refrigerants, including a GWP that is as low, or lower than the existing refrigerant and a capacity that is as high or higher than such refrigerants and a capacity that is substantially similar to or substantially matches, and preferably is as high as or higher than such refrigerants. In particular, applicants have recognized that certain preferred embodiments of the present compositions tend to exhibit relatively low global warming potentials ("GWPs"), preferably less than about 1000, more preferably less than about 500, and even more preferably less than about 150, commercial refrigeration systems and the like.

Many existing refrigeration systems are currently adapted for use in connection with existing refrigerants, and the compositions of the present invention are believed to be adaptable for use in many of such systems, either with or without system modification In general, the preferred heat transfer compositions of the present invention are zeotropic over much, and potentially over the entire, range of temperatures and pressures of use. That is, the mixtures of the components produce a liquid with a non-constant boiling temperature, therefore producing what is know as a "temperature glide" in the evaporator and condenser. The "temperature glide" is the change in temperature that occurs as a zeotropic material condenses or evaporates. This glide is preferably considered in connection with the method and composition aspects of the present invention in order to provide a composition which most effectively matches the refrigerant composition being replaced. In a single component or azeotropic mixture the temperature glide is 0. R-407C is a zeotropic mixture that has a 5° C. glide in typical applications, and in certain preferred embodiments, the present compositions produce a temperature glide of about 5° C. or less under conditions of actual or contemplated use.

The present compositions are also believed to be suitable as replacements for many compositions that are currently used in other applications, such as aerosols, blowing agents and the like, as explained elsewhere herein.

Particularly preferred embodiments of the compositions of the present invention are described below.

HFC-32/HFO-1234yf Based Compositions

In one preferred embodiment of the present invention, the compositions comprise a first component which comprises in major proportion, and preferably consists essentially of, and even more preferably consists of, HFC-32 and the second component comprises and preferably consists essentially of, and even more preferably consists of HFO-1234yf. In such embodiments, it is generally preferred that the amount of the HFC-32 present in the composition is from about 10 to about 90 percent by weight of the composition, more preferably from about 20 to about 90% by weight of the composition, and even more preferably from about 25 to about 85% by weight of the composition, based on the total weight of HFC-32 and HFO-1234yf. Applicants note, however, that in certain embodiments even less than 10% by weight of HFC-32 is preferred. For example, for those embodiments in which the composition is intended for use or is used as a replacement for HFC-134a, it is generally preferred that relatively small amounts, such as less than about 5% and even more preferably less than about 3% of HFC-32 are included in the compositions. In fact, in certain of such HFC-134a replacement embodiments, it may be desirable to include amounts of HFC-32 in the composition in amounts less than about 1% based on the total weight of HFC-32 and HFO-1234yf.

As mentioned above, the compositions in such preferred embodiments also comprise a second component comprising HFO-1234yf. In certain of such embodiments, the second component comprises HFO-1234yf in major proportion, and preferably consists essentially of, and even more preferably consists of, HFO-1234yf. The amount of HFO-1234yf present in the composition is preferably from about 10 to about 90 percent by weight of the composition, more preferably from about 10 to about 80% by weight of the composition, and even more preferably from about 15 to about 75% by weight of the composition.

According to certain preferred embodiments of the present invention, particularly and preferably in connection with embodiments in which the composition is intended or used as a replacement or alternative to R-404A, the amount of HFO-1234yf present in the composition, based upon the total weight of HFO-1234yf and HFC-32 in the composition, is from about 40% to about 80% by weight, more preferably from about 50% to about 80% by weight, and even more preferably from about 60% to about 80% by weight. Applicants have found that compositions within this range provide refrigerant fluids that have a global warming potential (GWP) that is much less than many standard refrigerants, including R-410A and R-404A while at the same time exhibiting performance parameters that are commercially comparable to such previously used refrigerants, including particularly R404A and R410A. One measure of such performance is provided by AHRI "A" conditions at 95° F. ambient. According to such a measure, applicants have surprisingly and/or advantageously found that compositions of the present invention comprising from about 30 to about 50% by weight of HFO-1234yf, relative to the total weight of HFO-1234yf and HFC-32 in the composition, are capable of providing an excellent match in the parameter of discharge temperature for refrigerants such as R-22 while still achieving acceptable performance parameters in connection with capacity and efficiency. For such embodiments, compositions comprising from about 35 to about 45% by weight of HFO-1234yf, and even more preferably about 40% by weight of HFO-1234yf, relative to the total weight of HFO-1234yf and HFC-32 in the composition are especially preferred.

According to certain preferred embodiments of the present invention the amount of HFO-1234yf present in the composition, based upon the total weight of HFO-1234yf and HFC-32 in the composition, is from about 10% to about 50% by weight, and more preferably from about 20% to about 40% by weight, and even more preferably from about 10% to about 30% by weight. Applicants have found that compositions within these ranges provide refrigerant fluids that have a global warming potential (GWP) that is much less than many standard refrigerants, including R-404a and R-410A, while at the same time exhibiting performance parameters that are commercially comparable to such previously used refrigerants, including particularly R410A, R404a and R-22. One measure of such performance criteria is provided by AHRI "A" conditions at 95° F. ambient.

Applicants have surprisingly and/or advantageously found that compositions of the present invention comprising from about 60% to about 80% by weight of HFO-1234yf, relative to the total weight of a total weight of HFO-1234yf and HFC-32 in the composition, are capable of providing an excellent match in the parameter of capacity and efficiency relative to refrigerants such as R404a while still achieving acceptable performance parameters in connection with discharge temperature. For such embodiments, compositions comprising from about 65 to about 85% by weight of HFO-1234yf, and even more preferably about 70% by weight of HFO-1234yf, relative to the total weight of a total weight of HFO-1234yf and HFC-32 in the composition are especially preferred, especially for use as replacements for R404a.

Applicants have surprisingly and/or advantageously found that compositions of the present invention comprising from about 10 to about 50% by weight of HFO-1234yf, relative to the total weight of a total weight of HFO-1234yf and HFC-32 in the composition, are capable of providing an excellent match in the parameter of capacity and efficiency relative to refrigerants such as R-410A while still achieving acceptable performance parameters in connection with discharge. For such embodiments, compositions comprising from about 20 to about 40% by weight of HFO-1234yf, and even more preferably about 30% by weight of HFO-1234yf, relative to the total weight of a total weight of HFO-1234yf and HFC-32 in the composition are especially preferred.

HFC-32/HFO-1234Ze Based Compositions

In one preferred embodiment of the present invention, the compositions comprise a first component which comprises in major proportion, and preferably consists essentially of, and even more preferably consists of, HFC-32 and the second component comprises and preferably consists essentially of, and even more preferably consists of HFO-1234ze, and even more preferably transHFO-1234ze. In such embodiments, it is generally preferred that the amount of the HFC-32 present in the composition is from about 3 to about 98 percent by weight of the composition, more preferably from about 10 to about 95% by weight of the composition, and even more preferably in certain embodiments, particularly those intended as or being used as replacement for 404a or 410A, from about 40 to about 95% by weight of the composition.

As mentioned above, the compositions in such preferred embodiments also comprise a second component comprising HFO-1234ze. In certain of such embodiments, the second component comprises HFO-1234ze, preferably transHFO-1234ze, in major proportion, and preferably consists essentially of, and even more preferably consists of, HFO-1234ze, preferably transHFO-1234ze, The amount of HFO-1234ze, preferably transHFO-1234ze, present in the composition is preferably from about 2 to about 97 percent by weight of the composition, more preferably from about 5 to about 90% by weight of the composition, and even more preferably in certain embodiments from about 5 to about 60% by weight of the composition.

According to certain preferred embodiments of the present invention the amount of HFO-1234ze, preferably transHFO-1234ze, present in the composition, based upon the total weight of HFO-1234ze and HFC-32 in the composition, is from about 25% to about 85% by weight. Applicants have found that compositions within this range provide refrigerant fluids that have a global warming potential (GWP) that is much less than many standard refrigerants, including R-410A while at the same time exhibiting performance parameters that are commercially comparable to such previously used refrigerants, including particularly R404A, R410A and R-22. One measure of such performance is provided by AHRI "A" conditions at 95° F. ambient.

According to such a measure, applicants have surprisingly and/or advantageously found that compositions of the present invention comprising from about 50 to about 70% by weight of HFO-1234ze, relative to the total weight of a total weight of HFO-1234ze and HFC-32 in the composition are capable of providing an excellent match in the parameter of discharge temperature for refrigerants such as R-22 while still achieving acceptable performance parameters in connection with capacity and efficiency. For such embodiments, compositions comprising from about 35 to about 45% by weight of HFO-1234ze, and even more preferably about 55% by weight of HFO-1234ze, relative to the total weight of a total weight of HFO-1234ze and HFC-32 in the composition are especially preferred.

According to certain preferred embodiments of the present invention the amount of HFO-1234ze present in the composition, based upon the total weight of HFO-1234ze and HFC-32 in the composition, is from about 5% to about 30% by weight, more preferably from about 5% to about 20% by weight, and even more preferably in certain embodiments 10% by weight. Applicants have found that compositions within these ranges and amounts provide refrigerant fluids that have a global warming potential (GWP) that is much less than many standard refrigerants, including R-410A while at the same time exhibiting performance parameters that are commercially comparable to such previously used refrigerants, including particularly R410A and R-22.

According to another preferred embodiment, applicants have surprisingly and/or advantageously found that compositions of the present invention comprising from about 5 to about 30% by weight of HFO-1234ze, relative to the total weight of HFO-1234ze and HFC-32 in the composition, are capable of providing an excellent match in the parameter of capacity and efficiency relative to refrigerants such as R-410A while still achieving acceptable performance parameters in connection with discharge temperature. For such embodiments, compositions comprising from about 5 to about 25% by weight of HFO-1234ze, and even more preferably about 10% by weight of HFO-1234ze, relative to the total weight of HFO-1234ze and HFC-32 in the composition are especially preferred.

According to certain preferred embodiments of the present invention, including particularly and preferably those in which the composition is used to add or intended for use as a replacement for alternative to R404A, the amount of HFO-1234ze present in the composition, based upon the total weight of HFO-1234ze and HFC-32 in the composition, is from about 40% to about 70% by weight, more preferably from about 40 to about 60% by weight, more preferably from about 45 to about 55% by weight, and even more preferably in certain embodiments 50% by weight. Applicants have found that compositions within these ranges and amounts provide refrigerant fluids that have a global warming potential (GWP) that is much less than many standard refrigerants, including R-404A while at the same time exhibiting performance parameters that are commercially comparable to such previously used refrigerants, including particularly R404A. One measure of such performance criteria is provided by AHRI "A" conditions at 95° F. ambient. According to such a measure, applicants have surprisingly and/or advantageously found that compositions of the present invention comprising from about 40 to about 70% by weight of HFO-1234ze, relative to the total weight of HFO-1234ze and HFC-32 in the composition, are capable of providing an excellent match in the parameter of capacity and efficiency relative to refrigerants such as R-404A while still achieving acceptable performance parameters in connection with discharge temperature. For such embodiments, compositions comprising from about 40 to about 60% by weight of HFO-1234ze, and even more preferably about 50% by weight of HFO-1234ze, relative to the total weight of HFO-1234ze and HFC-32 in the composition are especially preferred.

According to certain preferred embodiments of the present invention, including particularly and preferably those in which the composition is used to add or intended for use as a replacement for alternative to R-134a, the amount of HFO-1234ze present in the composition, based upon the total weight of HFO-1234ze and HFC-32 in the composition, is from about 80% to about 97% by weight, more preferably from about 80 to about 90% by weight, and even more preferably from about 85% by weight. Applicants have found that compositions within these ranges and amounts provide refrigerant fluids that have a global warming potential (GWP) that is much less than many standard refrigerants, including R-134a while at the same time exhibiting performance parameters that are commercially comparable to such previously used refrigerants, including particularly R-134a.

HFC-32/CF3I Based Compositions

In one preferred embodiment of the present invention, the compositions comprise a first component which comprises in major proportion, and preferably consists essentially of, and even more preferably consists of, HFC-32. In such embodiments, it is generally preferred that the amount of the HFC-32 present in the composition is from about 1 to about 60 percent by weight of the composition.

The compositions in such preferred embodiments also comprise a second component comprising CF3I. In certain of such embodiments, the second component comprises CF3I in major proportion, and preferably consists essentially of, and even more preferably consists of, CF3I. The amount of CF3I present in the composition is preferably from about 5 to about 98 percent by weight of the composition. For those embodiments in which the second component comprises both CF3I and HFO-1225, the relative amount of CF3I and HFO-1225 can vary widely, but it is preferred in such embodiments that the amount of CF3I is from about 5 to about 98 percent by weight of the composition and the amount of HFO-1225 is from about 1 to about 65 percent by weight of the composition. For embodiments in which the second component comprises CF3I and HF01225, the third component is optional, but if present, is preferably present in an amount of from about 1 to 94 percent by weight of the composition. In embodiments in which the second component consists essentially of CF3I, that is, the composition does not include a substantial amount of HFO-1225, the third component is required and is preferably present in the composition in an amount of at least about 1 percent by weight of the composition.

It is contemplated that a large number of combinations of compounds may be used as the third component of the present invention in this particular embodiment, and in a wide variety of relative concentrations, and all amounts and combinations are believed to be adaptable for use in accordance with the teachings contained herein. In certain preferred embodiments, however, wherein the third component comprises one or more of monofluoroethane (HFC-161), difluoroethane (HFC-152a), trifluoroethane (HFC-143a), 1,1,1,2-tetrafluoroethane (HFC-134a), pentafluoroethane (HFC-125), 1,1,1,3-tetrafluoropropene (HFO-1234ze, including all isomers) and 1,1,1,2-tetrafluoropropene (HFO-1234yf), it is preferred that, if present, such components are selected from within the ranges indicated in the following Table 1 (indicated amounts are intended to be understood to be preceded by the modifier "about" and are based on the weight percentage in the composition):

TABLE 1

| THIRD component↓ | WEIGHT PERCENTAGE |
|---|---|
| R-152a | 1-65 |
| R-134a | 1-70 |
| 1234ze | 1-80 |
| 1234-yf | 1-80 |
| R-125 | 1-30 |
| R-161 | 1-94 |
| R-143a | 1-20 |

HFC-32/HFO-1225 Based Compositions

In these embodiments of the present invention, the compositions comprise a first component which comprises in major proportion, and preferably consists essentially of, and even more preferably consists of, HFC-32. In such embodiments, it is generally preferred that the amount of the HFC-32 present in the composition is from about 1 to about 60 percent by weight of the composition.

The compositions in such preferred embodiments also comprise a second component comprising HFO-1225, preferably HFO-1225ye-Z. In certain of such embodiments, the second component comprises HFO-1225 in major proportion, and preferably consists essentially of, and even more preferably consists of, HFO-1225ye-Z. The amount of HFO-1225ye-Z present in the composition is preferably from about 5 to about 98 percent by weight of the composition. In such embodiments, the third component is optional, but if present, is preferably present in an amount of from about 1 to 94 percent by weight of the composition.

It is contemplated that a large number of combinations of compounds may be used as the third component of the present invention in this particular embodiment, and in a wide variety of relative concentrations, and all amounts and combinations are believed to be adaptable for use in accordance with the teachings contained herein. In certain preferred embodiments, however, wherein the third component comprises one or more of monofluoroethane (HFC-161), difluoroethane (HFC-152a), trifluoroethane (HFC-143a), 1,1,1,2-tetrafluoroethane (HFC-134a), pentafluoroethane (HFC-125), 1,1,1,3-tetrafluoropropene (HFO-1234ze, including all isomers) and 1,1,1,2-tetrafluoropropene (HFO-1234yf), it is preferred that, if present, such components are selected from within the ranges indicated in the following Table 2 (indicated amounts are intended to be understood to be preceded by the modifier "about" and are based on the weight percentage in the composition).

TABLE 2

| THIRD component↓ | WEIGHT PERCENTAGE |
|---|---|
| R-152a | 1-65 |
| R-134a | 1-70 |
| 1234ze | 1-80 |
| 1234-yf | 1-80 |
| R-125 | 1-30 |
| R-161 | 1-94 |
| R-143a | 1-20 |

The Selection Methods

One aspect of the present invention involves methods for selecting a heat transfer composition for use in connection with an existing heat transfer system. As used herein, the term "existing heat transfer system" includes not only actual heat transfer systems that have been built and are in place but also systems that are not yet built but are being conceived and/or are in the design phase. One preferred embodiment provides methods for selecting a heat transfer composition for use in connection with an existing heat transfer system that has been designed for use in connection with a previously known composition. In such cases, the previously known composition will generally have a desired or expected heat capacity but will also exhibit one or more undesirable properties. For example, each of the following previously known refrigerants have desirably heat capacities for the systems in which they are being used but also exhibit the undesirably high GWP as indicated:

| REFRIGERANT | GWP |
|---|---|
| R134a | 1300 |
| R125 | 3400 |
| R143a | 4300 |

The preferred method steps comprise analyzing the parameters of the system in a manner sufficient to permit approximation of the capacity of the existing or design heat transfer fluid and providing a tool that permits approximation of the capacity of two or more compositions of the present invention at the conditions of existing or design system, and utilizing said to select a composition for use in the existing or design system. Examples of such a tool are the charts illustrated in the Examples below. A computer program, configured in accordance with the teachings contained herein, is an example of another such tool. In preferred embodiments, the tool also is able to approximate, determine or incorporate the GWP and/or the flammability of the composition of the present invention and the selection step comprises selecting the composition so as to have a GWP of less than about 1000, and even more preferably less than about 150, and/or to have no flammability or flammability within a predetermined parameter.

Methods and Systems

The compositions of the present invention are useful in connection with numerous methods and systems, including as heat transfer fluids in methods and systems for transferring heat, such as refrigerants used in refrigeration, air conditioning and heat pump systems. The present compositions are also advantageous for in use in systems and methods of generating aerosols, preferably comprising or consisting of the aerosol propellant in such systems and methods. Methods of forming foams and methods of extinguishing and suppressing fire are also included in certain aspects of the present invention. The present invention also provides in certain aspects methods of removing residue from articles in which the present compositions are used as solvent compositions in such methods and systems.

Heat Transfer Methods and Systems

The preferred heat transfer methods generally comprise providing a composition of the present invention and causing heat to be transferred to or from the composition, either by sensible heat transfer, phase change heat transfer, or a combination of these. For example, in certain preferred embodiments the present methods provide refrigeration systems comprising a refrigerant of the present invention and methods of producing heating or cooling by condensing and/or evaporating a composition of the present invention. In certain preferred embodiments, the methods for cooling, including cooling of other fluid either directly or indirectly or a body directly or indirectly, comprise condensing a refrigerant composition comprising a composition of the present invention and thereafter evaporating said refrigerant composition in the vicinity of the article to be cooled. As used herein, the term "body" is intended to refer not only to inanimate objects but also to living tissue, including animal tissue in general and human tissue in particular. For example, certain aspects of the present invention involve application of the present composition to human tissue for one or more therapeutic purposes, such as a pain killing technique, as a preparatory anesthetic, or as part of a therapy involving reducing the temperature of the body being treated. In certain embodiments, the application to the body comprises providing the present compositions in liquid form under pressure, preferably in a pressurized container having a one-way discharge valve and/or nozzle, and releasing the liquid from the pressurized container by spraying or otherwise applying the composition to the body. As the liquid evaporates from the surface being sprayed, the surface cools.

Certain preferred methods for heating a fluid or body comprise condensing a refrigerant composition comprising a composition of the present invention in the vicinity of the fluid or body to be heated and thereafter evaporating said refrigerant composition. In light of the disclosure herein, those of skill in the art will be readily able to heat and cool articles according to the present inventions without undue experimentation.

Applicants have found that in the systems and methods of the present invention many of the important refrigeration system performance parameters are relatively close to the parameters of the existing refrigerant group mentioned above. Those skilled in the art will appreciate the substantial advantage of a low GWP and/or a low ozone depleting refrigerant that can be used as replacement for the refrigerants with relatively minimal modifications to the system. It is contemplated that in certain embodiments the present invention provides retrofitting methods which comprise replacing the heat transfer fluid (such as a refrigerant) in an existing system with a composition of the present invention, without substantial modification of the system. In certain preferred embodiments the replacement step is a drop-in replacement in the sense that no substantial redesign of the system is required and no major item of equipment needs to be replaced in order to accommodate the composition of the present invention as the heat transfer fluid. In certain preferred embodiments, the methods comprise a drop-in replacement in which the capacity of the system is at least about 70%, preferably at least about 85%, and even more preferably at least about 90% of the system capacity prior to replacement, and preferably not greater than about 130%, even more preferably less than about 115%, and even more preferably less than about 110%. In certain preferred embodiments, the methods comprise a drop-in replacement in which the suction pressure and/or the discharge pressure of the system, and even more preferably both, is/are at least about 70%, more preferably at least about 90% and even more preferably at least about 95% of the suction pressure and/or the discharge pressure prior to replacement, and preferably not greater than about 130%, even more preferably less than about 115, and even more preferably less than about 110%. In certain preferred embodiments, the methods comprise a drop-in replacement in which the mass flow of the system is at least about 80%, and even more preferably at least 90% of the mass flow prior to replacement, and preferably not greater than about 130%, even more preferably less than about 115, and even more preferably less than about 110%.

In certain embodiments the present invention provides cooling by absorbing heat from a fluid or body, preferably by evaporating the present refrigerant composition in the vicinity of the body or fluid to be cooled to produce vapor comprising the present composition. Preferably the methods include the further step of compressing the refrigerant vapor, usually with a compressor or similar equipment to produce vapor of the present composition at a relatively elevated pressure. Generally, the step of compressing the vapor results in the addition of heat to the vapor, thus causing an increase in the temperature of the relatively high pressure vapor. Preferably in such embodiments the present methods include removing from this relatively high temperature, high pressure vapor at least a portion of the heat added by the evaporation and compression steps. The heat removal step preferably includes condensing the high temperature, high pressure vapor while the vapor is in a relatively high pressure condition to produce a relatively high pressure liquid comprising a composition of the present invention. This relatively high pressure liquid preferably then undergoes a nominally isoenthalpic reduction in pressure to produce a relatively low temperature, low pressure liquid. In such embodiments, it is this reduced temperature refrigerant liquid which is then vaporized by heat transferred from the body or fluid to be cooled.

In another process embodiment of the invention, the compositions of the invention may be used in a method for producing heating which comprises condensing a refrigerant comprising the compositions in the vicinity of a liquid or body to be heated. Such methods, as mentioned hereinbefore, frequently are reverse cycles to the refrigeration cycle described above.

EXAMPLES

The following examples are provided for the purpose of illustrating the present invention but without limiting the scope thereof.

Example 1—Medium Temperature System with HFC-32 and $CF_3I$

The capacity of a heat transfer composition (and a refrigerant in particular) represents the cooling or heating capacity and provides some measure of the capability of a compressor to pump quantities of heat for a given volumetric flow rate of refrigerant. In other words, given a specific compressor, a refrigerant with a higher capacity will deliver more cooling or heating power.

A refrigeration/air conditioning cycle system is simulated or provided with a condenser temperature is about 40° C., an evaporator temperature of about 2° C., a superheat of about 10° C., and a sub-cool temperature of about 5° C., and a compressor efficiency of 0.7, which would normally be considered typical "medium temperature" conditions. Several compositions of the present invention are simulated and/or tested based on a first component consisting of HFC-32, a second component consisting of CF3I and one of a series of third components as described above. For each third component, the relative concentrations of all three components which substantially match the capacity of R-410A under the conditions mentioned above is determined. A curve of the various concentrations of each component for which the capacity substantially matches that of R0410A is then drawn or simulated (visually, mathematically, or a combination of each). An asterix is then placed on the curve to signify those compositions having a GWP of 1000 or less and a diamond is placed on the curve to signify those compositions having a GWP of greater than 1000. This procedure is repeated for all third component compounds identified above and for the second component compound HFO-1225ye-Z. One example of a "tool" for selecting a refrigerant for this system is thus developed and is presented as the chart in FIG. 1. The chart in FIG. 1 is analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 2—Medium Temperature System with HFC-32/$CO_2$ and $CF_3I$

Figure 2:
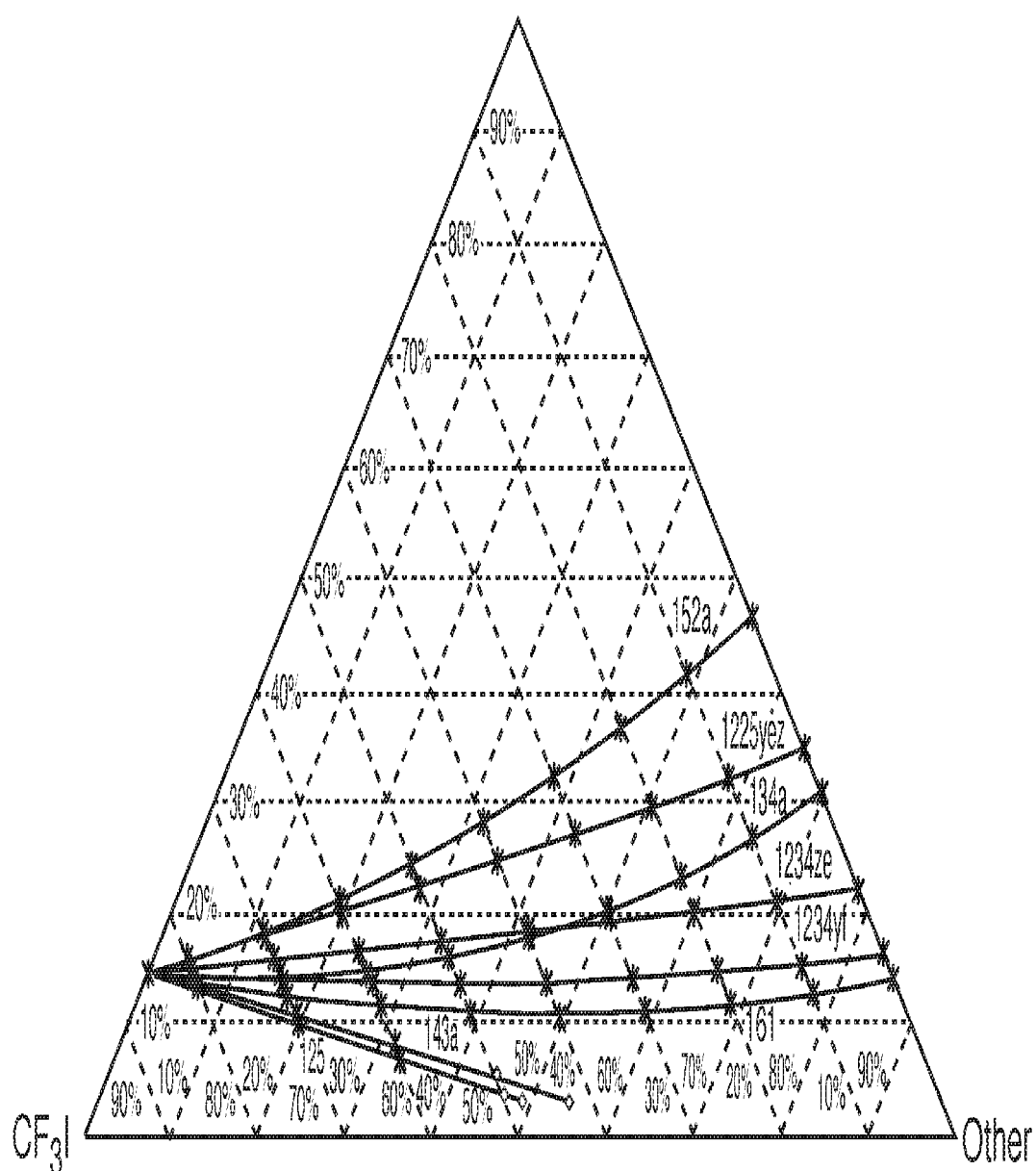

Example 1 is repeated except that the first component of the heat transfer composition consists of 3 percent by weight of $CO_2$ and 97 percent by weight of HFC-32 and that the refrigerant whose capacity is to be matched is R-410A. The chart in FIG. 2 is developed and analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 3—Medium Temperature System with HFC-32/$CO_2$ and $CF_3I$

Figure 3:
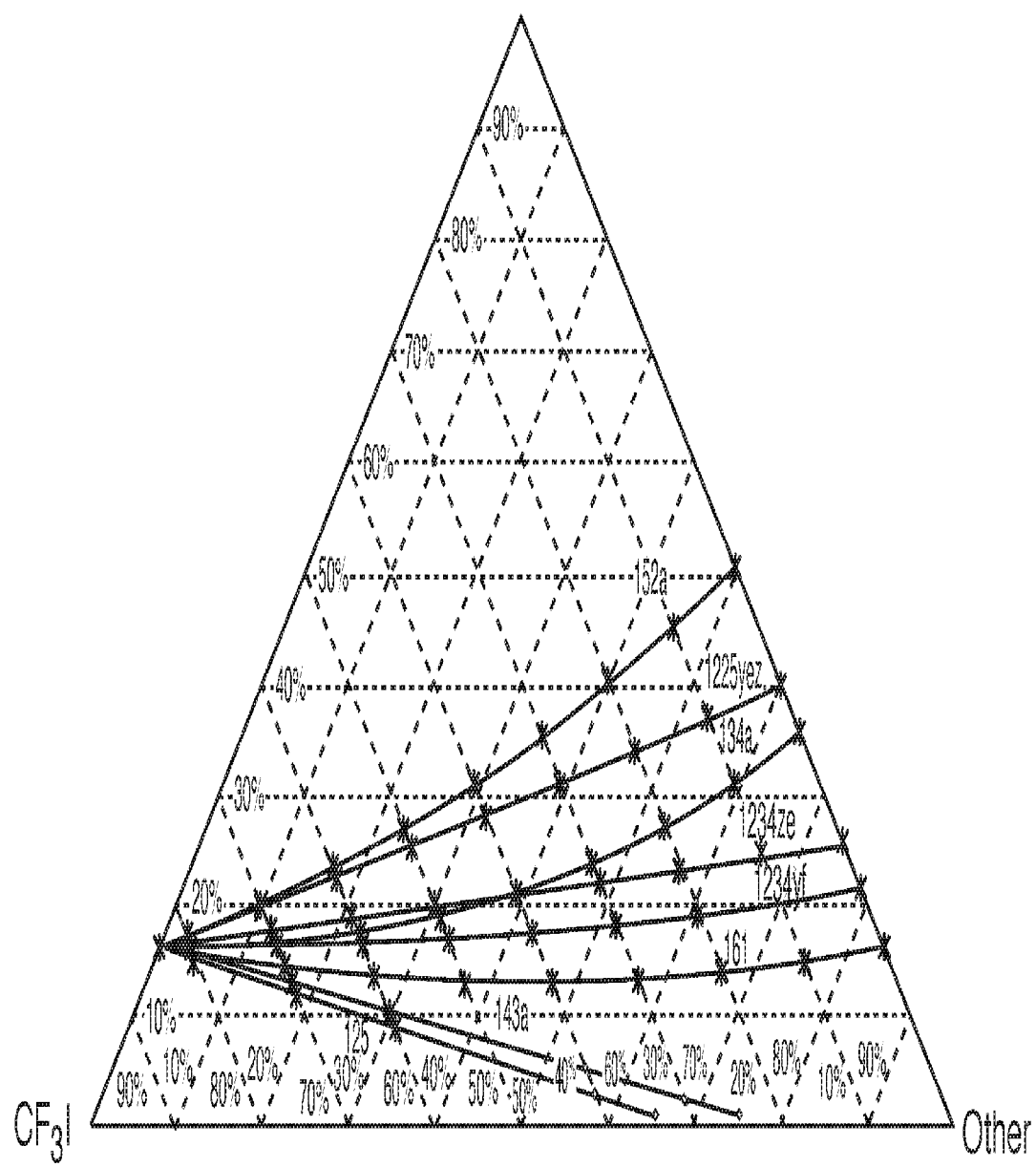

Example 1 is repeated except that the first component of the heat transfer composition consists of 1 percent by weight of CO2 and 99 percent by weight of HFC-32 and that the refrigerant whose capacity is to be matched is R-410A. The chart in FIG. 3 is developed and analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 4—Low Temperature System with HFC-32/$CO_2$ and $CF_3I$

Figure 4:
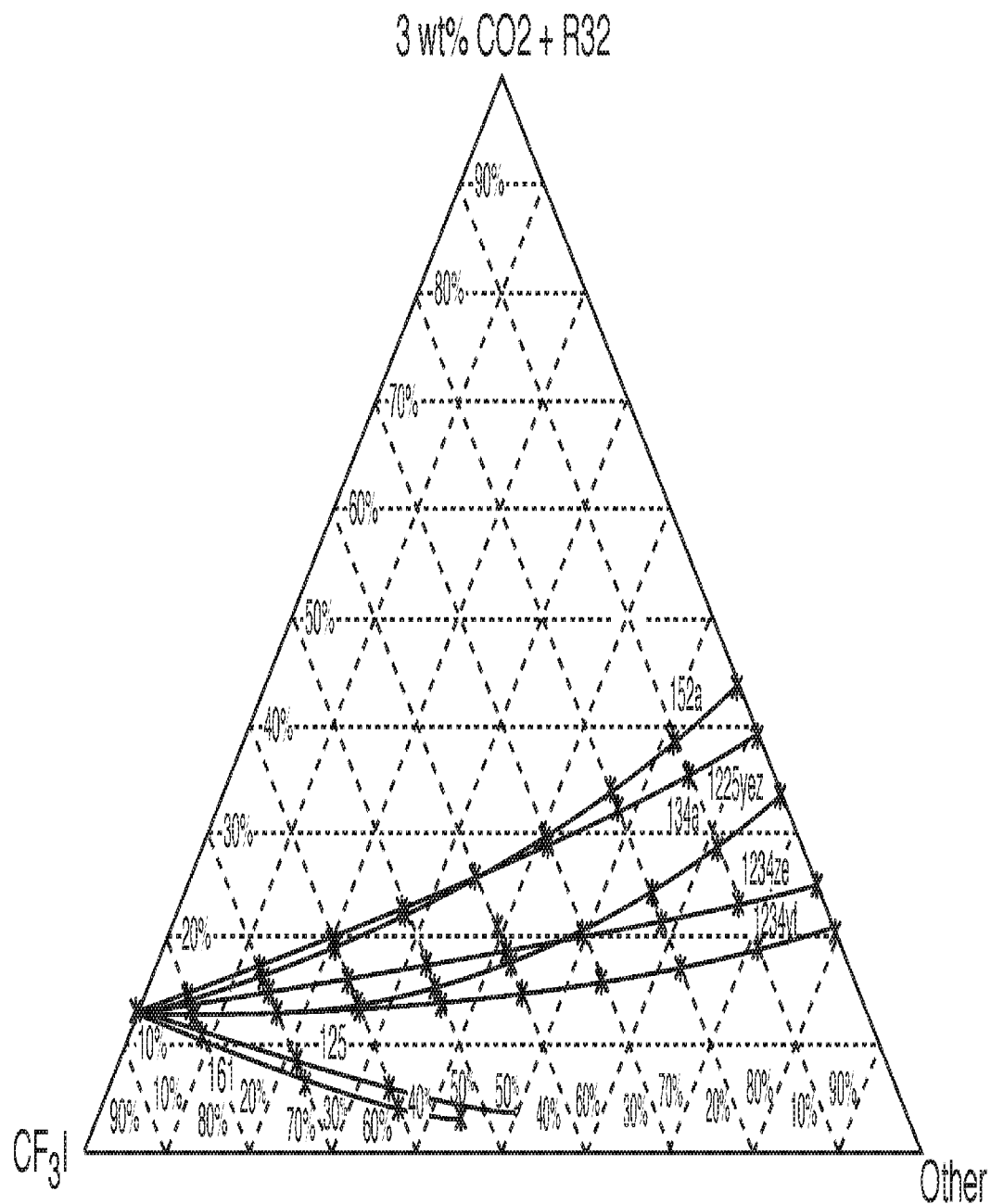

Example 1 is repeated except that the first component of the heat transfer composition consists of 3 percent by weight of CO2 and 99 percent by weight of HFC-32, and that the refrigerant whose capacity is to be matched is R-410A, and that the conditions are a condenser temperature of about 45° C., an evaporator temperature of about −34° C., a superheat of about 10° C., and a sub-cool temperature of about 5° C., and a compressor efficiency of 0.7, which would normally be considered typical "low temperature" conditions. The chart in FIG. 4 is developed and analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 5—Low Temperature System with HFC-32/$CO_2$ and $CF_3I$

Figure 5:
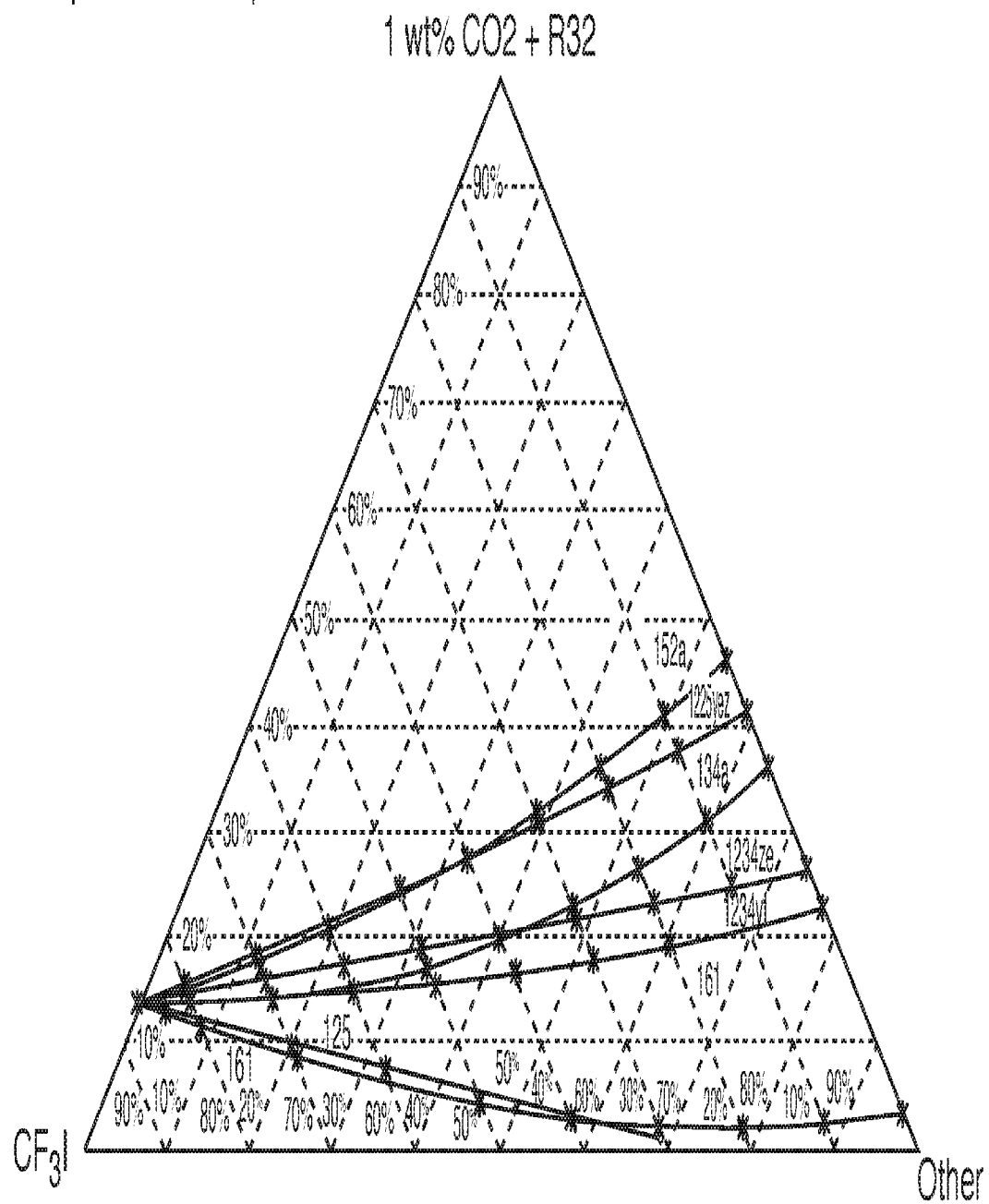

Example 1 is repeated except that the first component of the heat transfer composition consists of 1 percent by weight of CO2 and 99 percent by weight of HFC-32, and that the refrigerant whose capacity is to be matched is R-410A, and that the conditions are a condenser temperature of about 45° C., an evaporator temperature of about −34° C., a superheat of about 10° C., and a sub-cool temperature of about 5° C., and a compressor efficiency of 0.7, which would normally be considered typical "low temperature" conditions. The chart in FIG. 5 is developed and analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 6—Medium Temperature System with HFC-32 and HFO-1225

Figure 6:
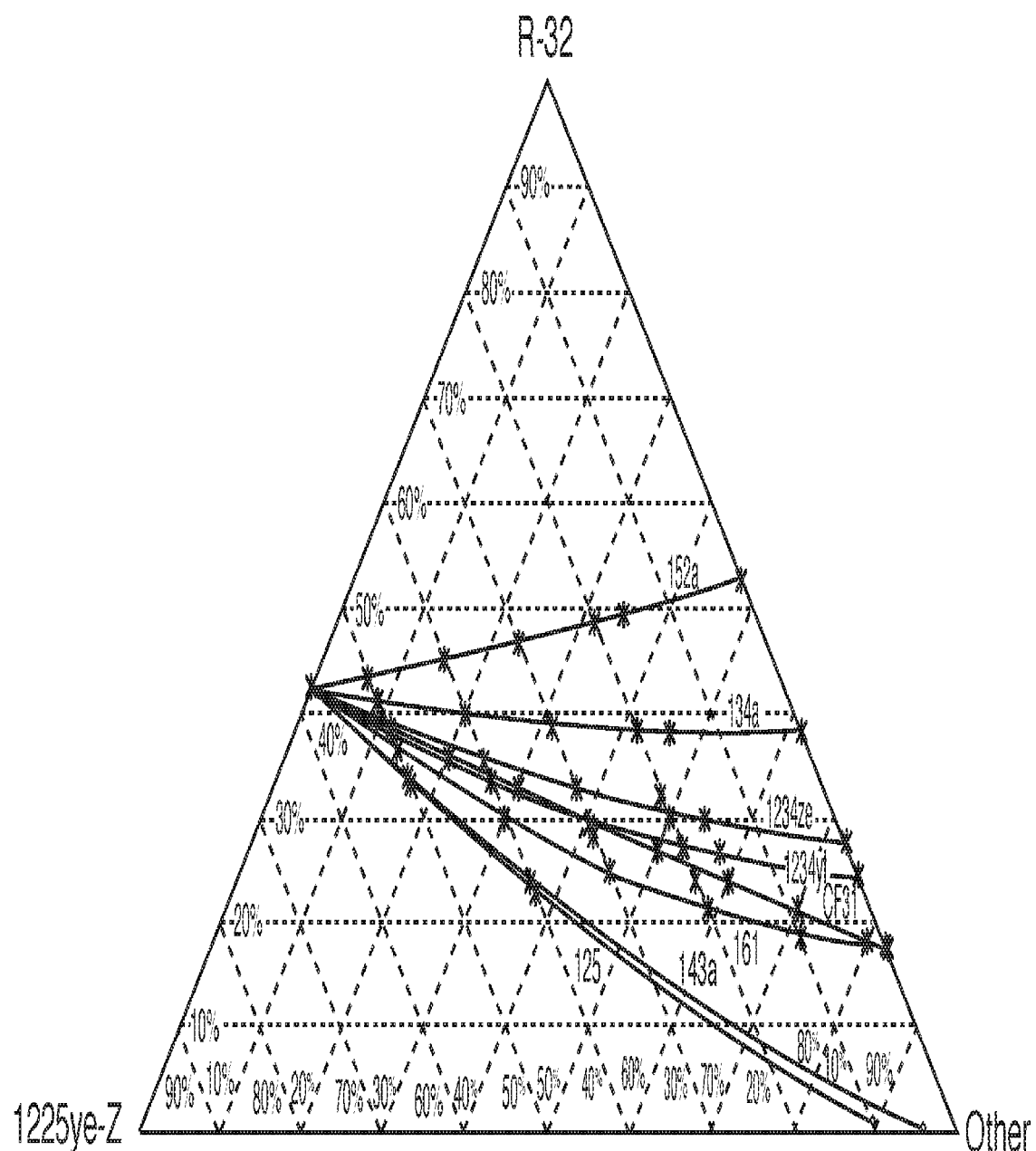

A refrigeration/air conditioning cycle system is simulated or provided with a condenser temperature is about 40° C., an evaporator temperature of about 2° C., a superheat of about 10° C., and a sub-cool temperature of about 5° C., and a compressor efficiency of 0.7, which would normally be considered typical "medium temperature" conditions. Several compositions of the present invention are simulated and/or tested based on a first component consisting of HFC-32, a second component consisting of HFO-1225ye-Z and one of a series of third components as described above. For each third component, the relative concentrations of all three components which substantially match the capacity of R-410A under the conditions mentioned above is determined. A curve of the various concentrations of each component for which the capacity substantially matches that of R0410A is then drawn or simulated (visually, mathematically, or a combination of each). An asterix is then placed on the curve to signify those compositions having a GWP of 1000 or less and a diamond is placed on the curve to signify those compositions having a GWP of greater than 1000. This procedure is repeated for all third component compounds identified above and for the second component compound CF3I. One example of a "tool" for selecting a refrigerant for this system is thus developed and is presented as the chart in FIG. 6. The chart in FIG. 6 is analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 7—Low Temperature System with HFC-32 and HFO-1225

Figure 7:
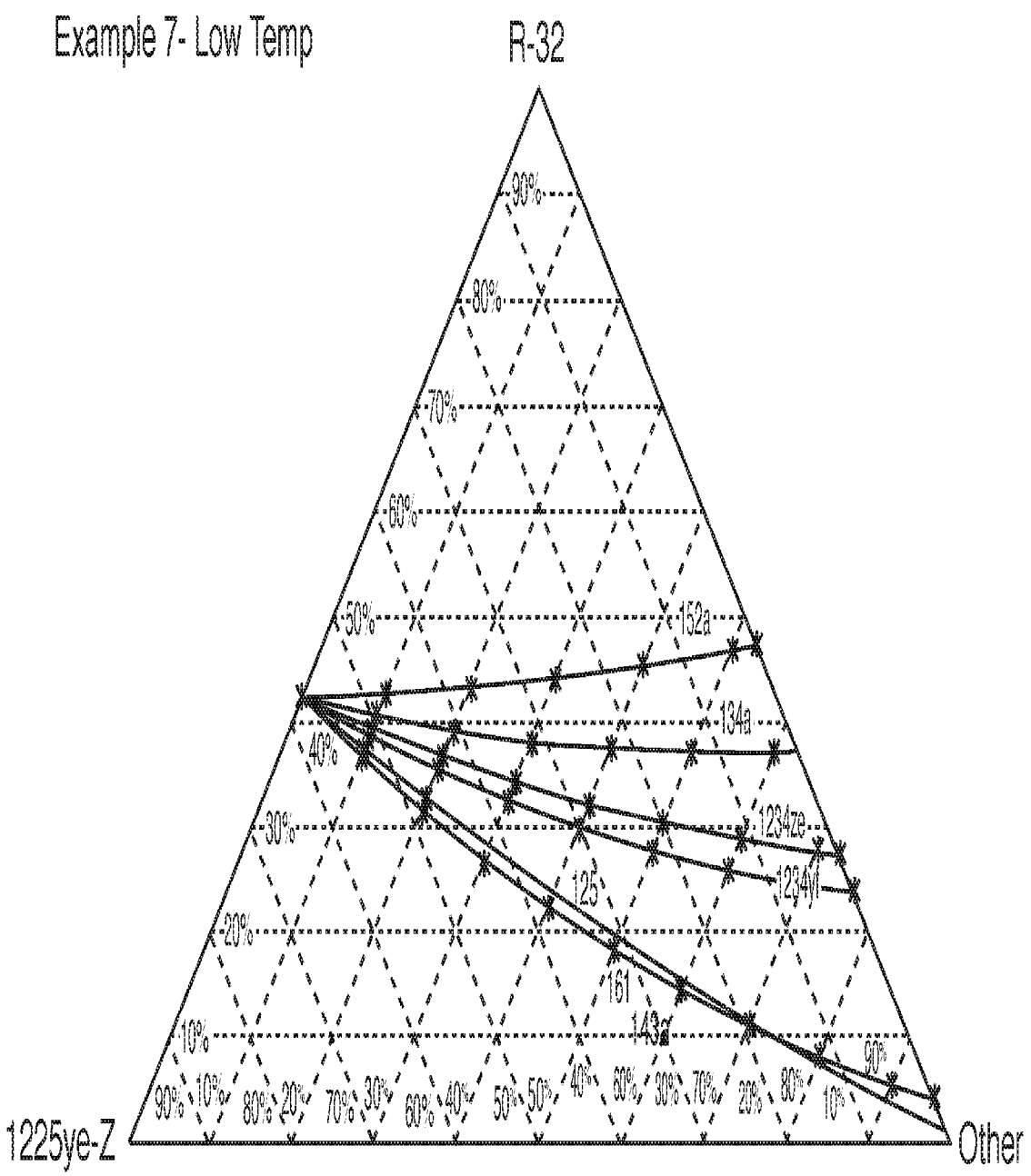

Example 6 is repeated except that the conditions are a condenser temperature of about 45° C., an evaporator temperature of about −34° C., a superheat of about 10° C., and a sub-cool temperature of about 5° C., and a compressor efficiency of 0.7, which would normally be considered typical "low temperature" conditions. The chart in FIG. 7 is developed and analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 8—Medium Temperature System with HFC-32/$CO_2$ and HFO-1225

Figure 8:
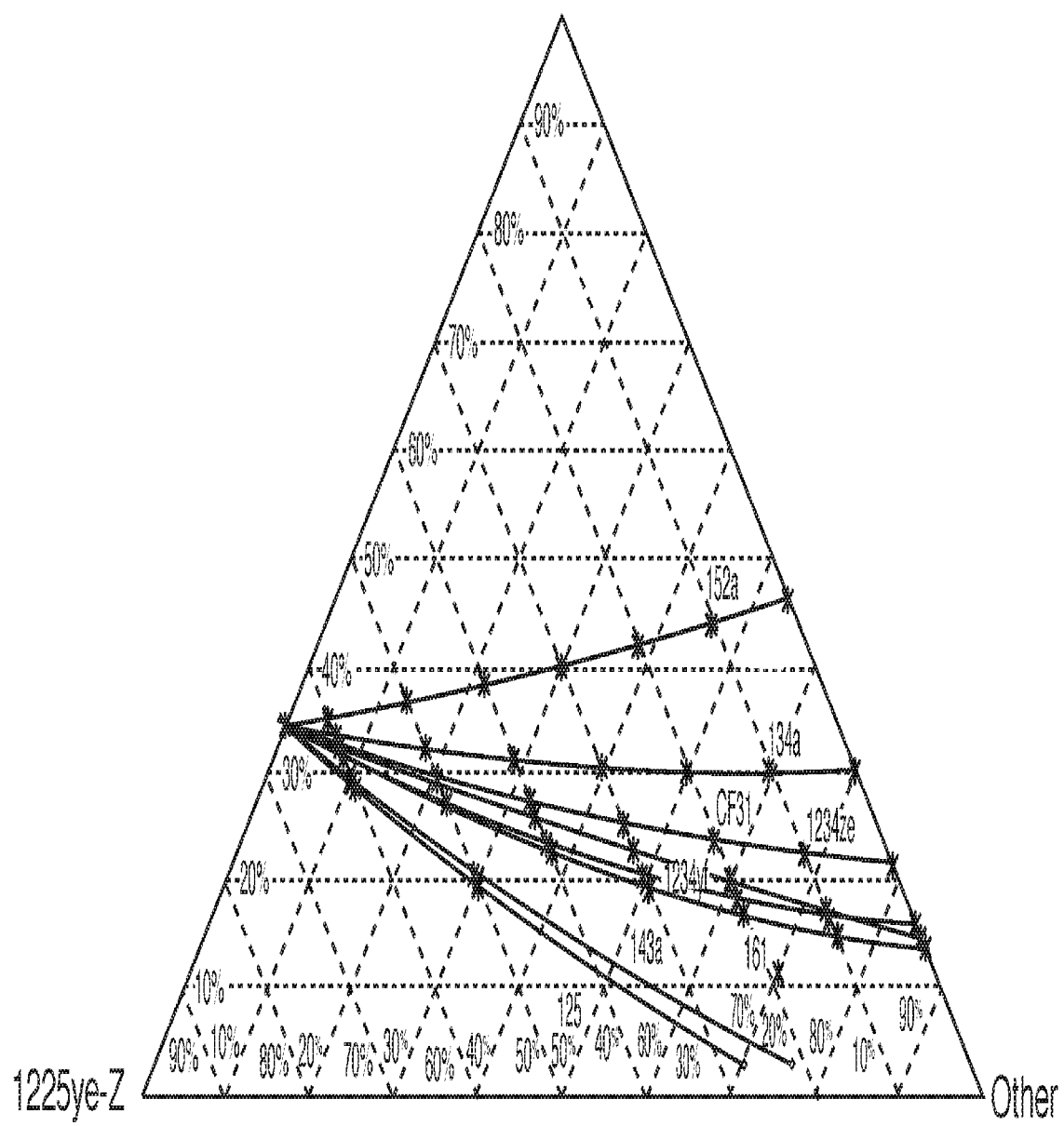

Example 6 is repeated except that the first component of the heat transfer composition consists of 3 percent by weight of CO2 and 97 percent by weight of HFC-32. The chart in FIG. 8 is developed and analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 9—Medium Temperature System with HFC-32/$CO_2$ and HFO-1225

Figure 9:
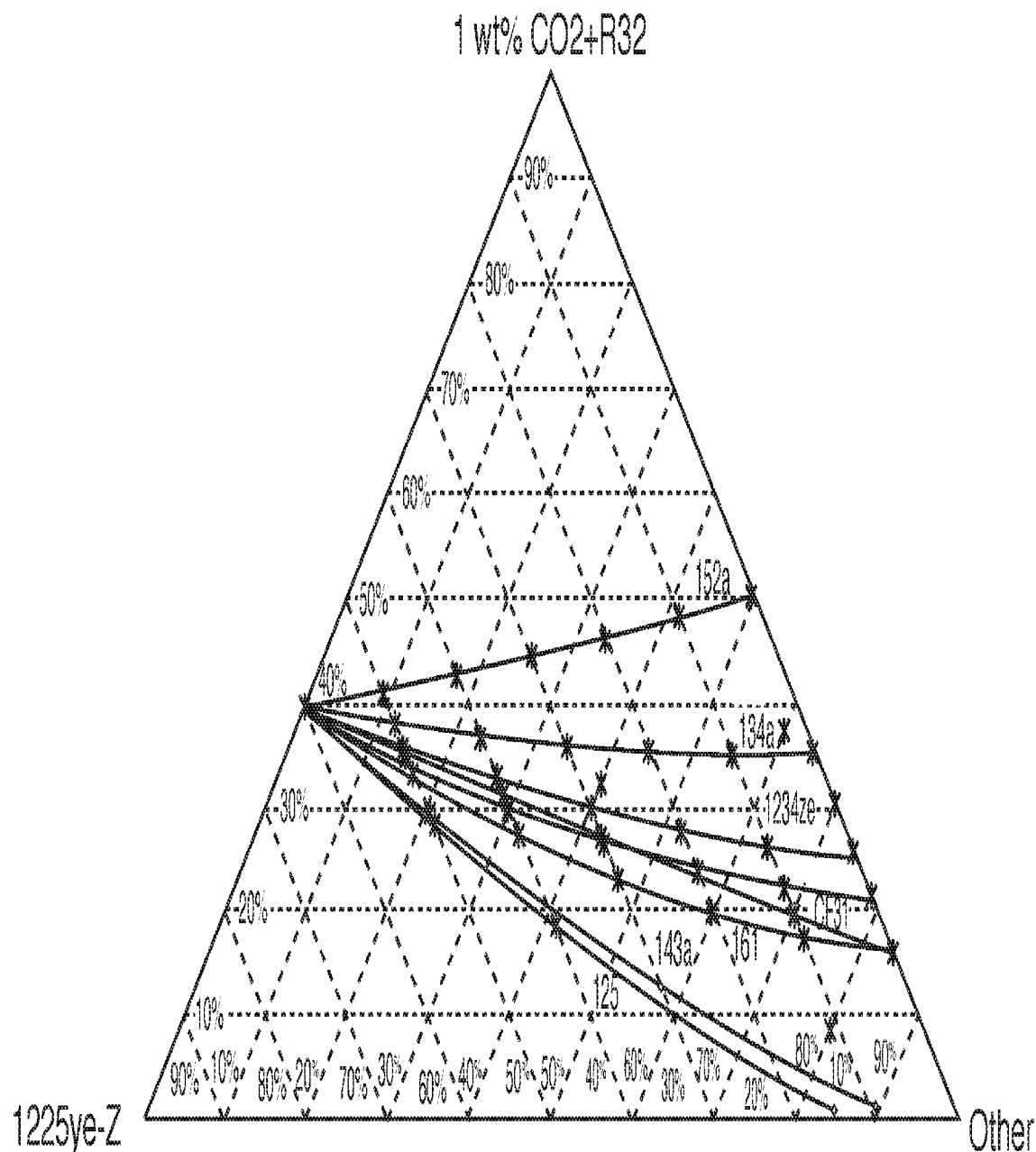

Example 6 is repeated except that the first component of the heat transfer composition consists of 1 percent by weight of CO2 and 97 percent by weight of HFC-32. The chart in FIG. 9 is developed and analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 10—Low Temperature System with HFC-32/$CO_2$ and HFO-1225

Figure 10:
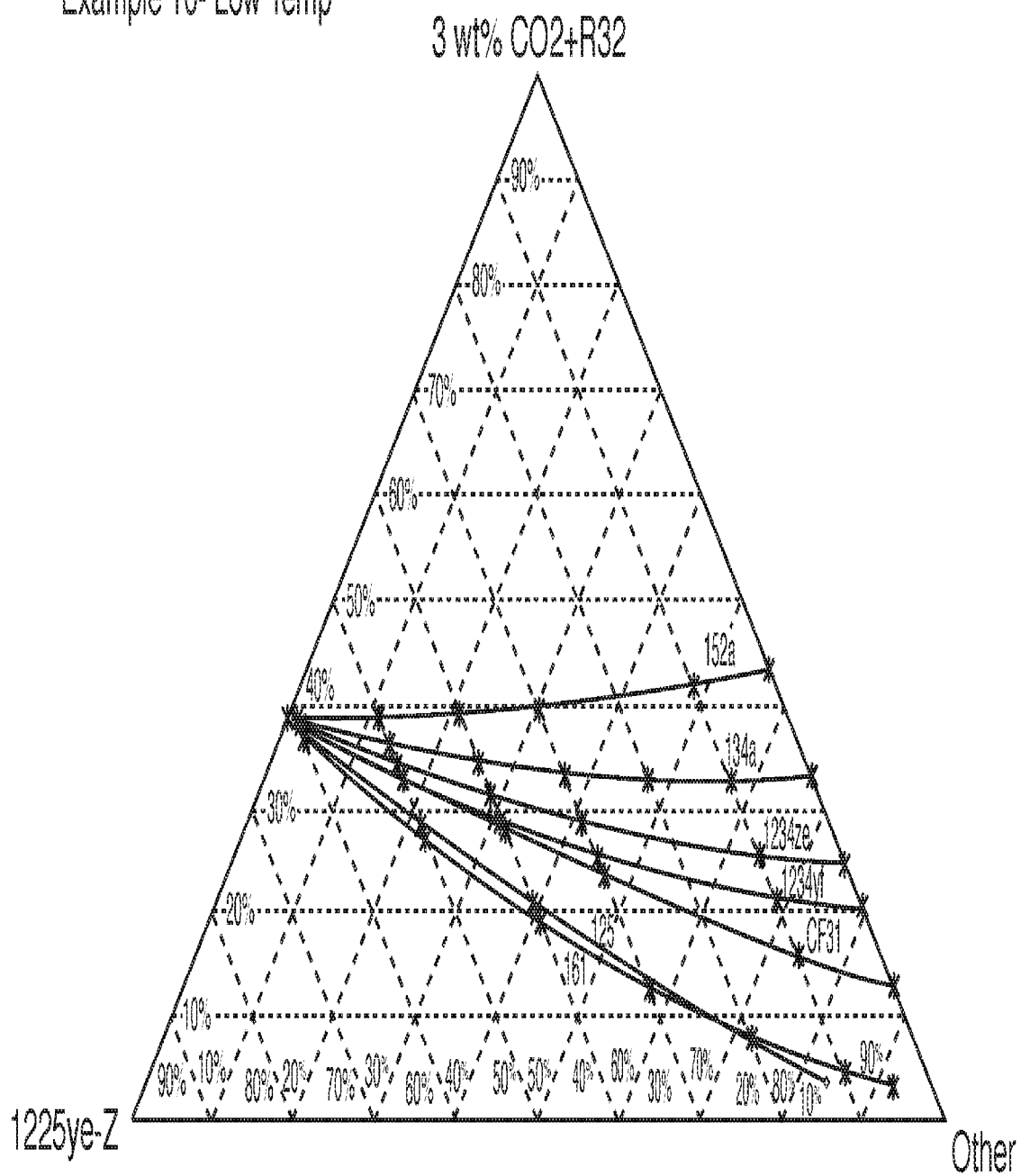

Example 6 is repeated except that the first component of the heat transfer composition consists of 3 percent by weight of CO2 and 97 percent by weight of HFC-32 and that the conditions are a condenser temperature of about 45° C., an evaporator temperature of about −34° C., a superheat of about 10° C., and a sub-cool temperature of about 5° C., and a compressor efficiency of 0.7, which would normally be considered typical "low temperature" conditions. The chart in FIG. 10 is developed and analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 11—Low Temperature System with HFC-32/CO$_2$ and HFO-1225

Figure 11:
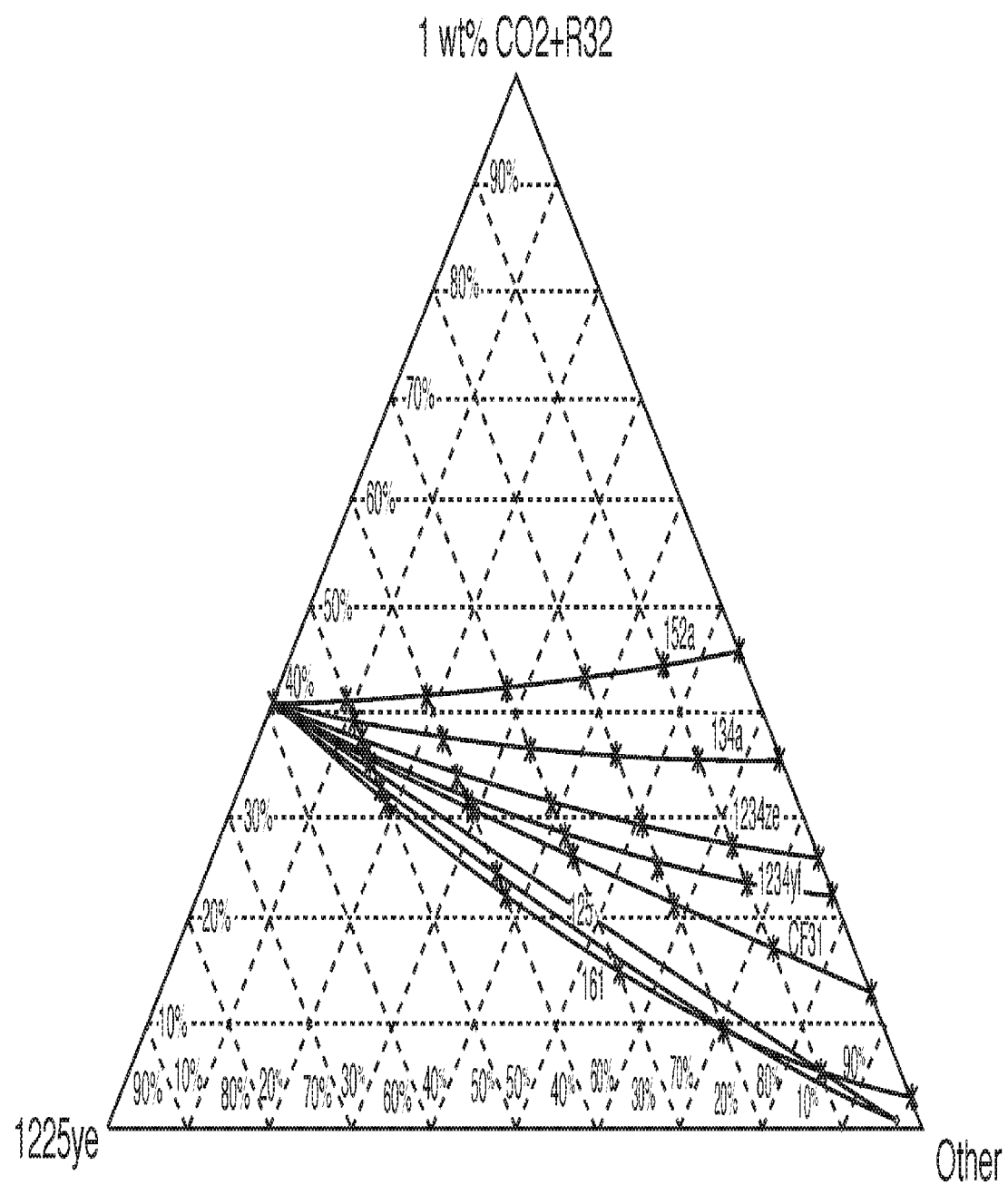

Example 6 is repeated except that the first component of the heat transfer composition consists of 1 percent by weight of CO2 and 99 percent by weight of HFC-32 and that the conditions are a condenser temperature of about 45° C., an evaporator temperature of about −34° C., a superheat of about 10° C., and a sub-cool temperature of about 5° C., and a compressor efficiency of 0.7, which would normally be considered typical "low temperature" conditions. The chart in FIG. 11 is developed and analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 12—Low Temperature System with HFC-32 and CF$_3$I

Figure 12:
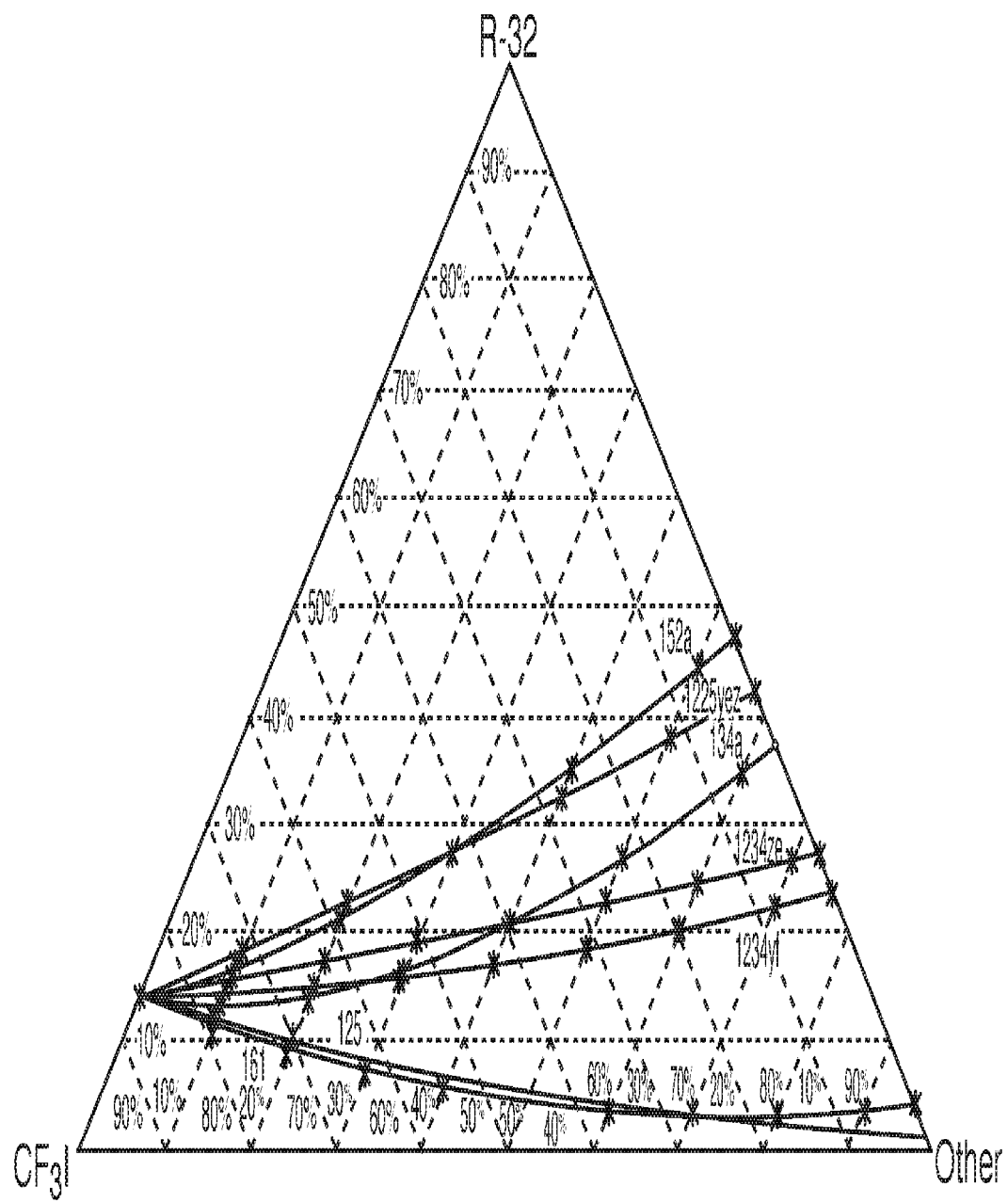

Example 1 is repeated except that the conditions are a condenser temperature of about 45° C., an evaporator temperature of about −34° C., a superheat of about 10° C., and a sub-cool temperature of about 5° C., and a compressor efficiency of 0.7, which would normally be considered typical "low temperature" conditions. The chart in FIG. 12 is developed and analyzed to identify compositions which fall on or about the curves and for which GWP is less than about 1000. This identification is preferably preceded or followed by an analysis of the flammability of the compositions, and then a selection is made of a composition to use as an original component of such system or as a replacement or retrofit to such an existing system.

Example 13

The vapor liquid equilibrium (VLE) of a mixture of HFO-1234ze(E) and R-32 was measured by 2 separate methods. The first method is an open ebulliometer which measures the bubble point temperature of a mixture at atmospheric pressure which is shown in Table 3. The second method is in a sealed system which allows for pressures above atmospheric which is shown in Table 4.

TABLE 3

Ebulliometer Data of HFO-1234ze(E) + R-32

| T, ° C. | P, psia | Liquid, wt % | |
|---|---|---|---|
| | | HFO-1234ze(E) | R-32 |
| −18.8 | 14.39 | 100.0 | 0.0 |
| −26.3 | 14.39 | 94.8 | 5.2 |
| −29.0 | 14.39 | 90.4 | 9.6 |
| −31.8 | 14.39 | 86.4 | 13.6 |
| −35.4 | 14.39 | 74.6 | 25.4 |
| −38.4 | 14.39 | 64.6 | 35.4 |
| −40.6 | 14.39 | 53.2 | 46.8 |
| −42.4 | 14.39 | 48.2 | 51.8 |
| −43.7 | 14.39 | 42.9 | 57.1 |
| −44.9 | 14.39 | 39.8 | 60.2 |
| −47.3 | 14.39 | 36.5 | 63.5 |
| −19.1 | 14.52 | 100.0 | 0.0 |
| −22.9 | 14.52 | 98.4 | 1.6 |
| −30.3 | 14.52 | 91.2 | 8.8 |
| −34.1 | 14.52 | 83.1 | 16.9 |
| −37.0 | 14.52 | 75.7 | 24.3 |
| −38.7 | 14.52 | 69.7 | 30.3 |
| −40.0 | 14.52 | 63.6 | 36.4 |
| −51.4 | 14.23 | 0.0 | 100.0 |
| −51.5 | 14.23 | 0.5 | 99.5 |
| −51.2 | 14.23 | 2.8 | 97.2 |
| −50.4 | 14.23 | 5.0 | 95.0 |
| −49.1 | 14.23 | 23.6 | 76.4 |

TABLE 4

VLE data for HFO-1234ze(E) + R-32

| T, ° C. | P, psia | Liquid, wt % | |
|---|---|---|---|
| | | HFO-1234ze(E) | R-32 |
| −3.6 | 48.7 | 93.4 | 6.6 |
| −3.6 | 48.0 | 93.4 | 6.6 |
| 1.4 | 32.5 | 100.0 | 0.0 |
| 1.1 | 44.1 | 96.2 | 3.8 |
| 1.3 | 46.1 | 96.2 | 3.8 |
| 1.4 | 42.3 | 96.2 | 3.8 |
| 1.3 | 51.1 | 93.4 | 6.6 |
| 1.7 | 57.1 | 93.4 | 6.6 |
| 21.7 | 72.9 | 96.2 | 3.8 |
| 21.9 | 75.4 | 96.2 | 3.8 |
| 21.9 | 73.8 | 96.2 | 3.8 |
| 21.5 | 81.4 | 93.4 | 6.6 |
| 21.6 | 84.9 | 93.4 | 6.6 |
| 21.6 | 86.0 | 93.4 | 6.6 |
| 40.8 | 116.7 | 100.0 | 0.0 |
| 41.1 | 116.0 | 100.0 | 0.0 |
| 41.7 | 134.8 | 96.2 | 3.8 |
| 41.7 | 138.5 | 96.2 | 3.8 |
| 41.7 | 139.5 | 96.2 | 3.8 |
| 41.5 | 145.2 | 93.4 | 6.6 |
| 41.6 | 151.2 | 93.4 | 6.6 |
| 41.6 | 155.7 | 93.4 | 6.6 |
| 41.6 | 155.4 | 93.4 | 6.6 |
| 41.6 | 153.4 | 93.4 | 6.6 |

The VLE of a mixture of HFO-1234yf and R-32 was measured by 2 separate methods. The first method is an open ebulliometer which measures the bubble point temperature of a mixture at atmospheric pressure which is shown in Table 5. The second method is in a sealed system which allows for pressures above atmospheric which is shown in Table 6.

TABLE 5

Ebulliometer Data of HFO-1234yf + R-32

| T, ° C. | P, psia | Liquid, wt % | |
|---|---|---|---|
| | | HFO-1234ze(E) | R-32 |
| −29.1 | 14.3 | 0.0 | 100.0 |
| −31.2 | 14.3 | 0.9 | 99.1 |
| −37.3 | 14.3 | 6.6 | 93.4 |
| −42.2 | 14.3 | 24.4 | 75.6 |
| −45.2 | 14.3 | 33.4 | 66.6 |
| −46.6 | 14.3 | 43.9 | 56.1 |
| −48.2 | 14.3 | 53.4 | 46.6 |
| −48.3 | 14.3 | 57.9 | 42.1 |
| −51.1 | 14.2 | 100.0 | 0.0 |

TABLE 5-continued

Ebulliometer Data of HFO-1234yf + R-32

| | | Liquid, wt % | |
|---|---|---|---|
| T, ° C. | P, psia | HFO-1234ze(E) | R-32 |
| −51.1 | 14.2 | 98.6 | 1.4 |
| −51.1 | 14.2 | 96.1 | 3.9 |
| −50.4 | 14.2 | 92.4 | 7.6 |
| −49.6 | 14.2 | 86.3 | 13.7 |
| −49.5 | 14.2 | 75.6 | 24.4 |
| −49.4 | 14.2 | 68.6 | 31.4 |

TABLE 6

VLE data for HFO-1234yf + R-32

| | | Liquid, wt % | |
|---|---|---|---|
| T, ° C. | P, psia | HFO-1234ze(E) | R-32 |
| −8.4 | 40.8 | 4.3 | 95.7 |
| −8.5 | 48.7 | 9.6 | 90.4 |
| −8.3 | 73.2 | 32.6 | 67.4 |
| 16.6 | 91.6 | 4.3 | 95.7 |
| 16.3 | 111.0 | 9.6 | 90.4 |
| 16.5 | 151.3 | 32.6 | 67.4 |
| 41.9 | 186.0 | 4.3 | 95.7 |

TABLE 6-continued

VLE data for HFO-1234yf + R-32

| | | Liquid, wt % | |
|---|---|---|---|
| T, ° C. | P, psia | HFO-1234ze(E) | R-32 |
| 41.9 | 215.8 | 9.6 | 90.4 |
| 42.1 | 289.9 | 32.6 | 67.4 |

Example 15

Using the data in Tables 3 and 4, performance of these refrigerants in a typical air conditioning application was evaluated. The conditions of the air conditioning cycle were:
Evaporator temperature=2° C.
Condenser temperature=40° C.
Sub-Cool=5° C.
Superheat=10° C.
Isentropic compressor efficiency=0.7

Using these conditions the capacity, COP, compressor discharge temperature and condenser and evaporator glides have been calculated and are shown in Tables 7A and 7B. The cycle performance and GWP on the mixtures was also calculated and is shown in Tables 8A and 8B. One disadvantage to using pure R-32 is the high discharge temperature. The glide of the HFO-1234ze(E)+R-32 mixtures is <9° C. over all compositions and the glide of the HFO-1234yf+R-32 mixtures is <7° C. over all compositions.

TABLE 7A

Air conditioning cycle analysis of HFO-1234ze(E) + R-32 blends

| | Pressure, psia | | Temperature, ° C. | | |
|---|---|---|---|---|---|
| | | | Compressor | Evaporator | Condenser |
| Fluid | Evaporator | Condenser | Discharge | Glide | Glide |
| 404A | 93.3 | 264.3 | 61.2 | 0.4 | 0.3 |
| 410A | 123.5 | 351.3 | 77.2 | 0.1 | 0.1 |
| HFC-134a | 45.6 | 147.4 | 64.05 | 0.0 | 0.0 |
| HFO-1234ze(E) | 32.9 | 109.6 | 60.4 | 0.0 | 0.0 |
| 99 wt % 1234ze(E) + 1 wt % R-32 | 34.1 | 114.0 | 61.6 | 0.9 | 1.4 |
| 97 wt % 1234ze(E) + 3 wt % R-32 | 36.6 | 122.4 | 63.7 | 2.6 | 3.7 |
| 95 wt % 1234ze(E) + 5 wt % R-32 | 39.1 | 130.3 | 65.6 | 4.1 | 5.5 |
| 90 wt % 1234ze(E) + 10 wt % R-32 | 45.1 | 148.1 | 69.3 | 6.7 | 8.2 |
| 80 wt % 1234ze(E) + 20 wt % R-32 | 56.3 | 177.9 | 74.1 | 8.8 | 8.7 |
| 70 wt % 1234ze(E) + 30 wt % R-32 | 66.2 | 204.4 | 77.5 | 8.3 | 7.5 |
| 60 wt % 1234ze(E) + 40 wt % R-32 | 75.5 | 228.8 | 80.3 | 6.9 | 6.1 |
| 50 wt % 1234ze(E) + 50 wt % R-32 | 84.4 | 251.2 | 82.8 | 5.5 | 5.0 |
| 40 wt % 1234ze(E) + 60 wt % R-32 | 92.6 | 272.4 | 85.4 | 4.3 | 4.2 |
| 30 wt % 1234ze(E) + 70 wt % R-32 | 100.5 | 293.0 | 88.2 | 3.5 | 3.5 |
| 20 wt % 1234ze(E) + 80 wt % R-32 | 108.3 | 313.7 | 91.0 | 2.7 | 2.8 |
| 10 wt % 1234ze(E) + 90 wt % R-32 | 116.4 | 335.2 | 93.8 | 1.7 | 1.8 |
| R-32 | 125.7 | 359.5 | 95.8 | 0.0 | 0.0 |

TABLE 7B

Air conditioning cycle analysis of HFO-1234yf + R-32 blends

| | Pressure, psia | | Temperature, ° C. | | |
|---|---|---|---|---|---|
| | | | Compressor | Evaporator | Condenser |
| Fluid | Evaporator | Condenser | Discharge | Glide | Glide |
| 404A | 93.3 | 264.3 | 61.2 | 0.4 | 0.3 |
| 410A | 123.5 | 351.3 | 77.2 | 0.1 | 0.1 |
| HFC-134a | 45.6 | 147.4 | 64.05 | 0.0 | 0.0 |
| HFO-1234yf | 48.5 | 145.3 | 55.6 | 0.0 | 0.0 |
| 99 wt % 1234yf + 1 wt % R-32 | 50.0 | 150.2 | 56.6 | 0.7 | 1.1 |
| 97 wt % 1234yf + 3 wt % R-32 | 52.8 | 159.6 | 58.4 | 1.8 | 2.9 |

TABLE 7B-continued

Air conditioning cycle analysis of HFO-1234yf + R-32 blends

| | Pressure, psia | | Temperature, °C. | | |
|---|---|---|---|---|---|
| | | | Compressor | Evaporator | Condenser |
| Fluid | Evaporator | Condenser | Discharge | Glide | Glide |
| 95 wt % 1234yf + 5 wt % R-32 | 55.7 | 168.4 | 60.0 | 2.9 | 4.3 |
| 90 wt % 1234yf + 10 wt % R-32 | 62.5 | 188.4 | 63.4 | 4.7 | 6.4 |
| 80 wt % 1234yf + 20 wt % R-32 | 74.9 | 221.7 | 68.1 | 6.0 | 6.8 |
| 70 wt % 1234yf + 30 wt % R-32 | 85.5 | 249.9 | 71.7 | 5.3 | 5.7 |
| 60 wt % 1234yf + 40 wt % R-32 | 94.7 | 273.9 | 74.8 | 4.1 | 4.3 |
| 50 wt % 1234yf + 50 wt % R-32 | 102.5 | 294.4 | 77.9 | 2.9 | 3.1 |
| 40 wt % 1234yf + 60 wt % R-32 | 109.1 | 311.7 | 81.0 | 1.9 | 2.1 |
| 30 wt % 1234yf + 70 wt % R-32 | 114.5 | 326.4 | 84.4 | 1.2 | 1.4 |
| 20 wt % 1234yf + 80 wt % R-32 | 118.9 | 339.0 | 88.1 | 0.6 | 0.8 |
| 10 wt % 1234yf + 90 wt % R-32 | 122.6 | 349.9 | 91.8 | 0.3 | 0.4 |
| R-32 | 125.7 | 359.5 | 95.8 | 0.0 | 0.0 |

TABLE 8A

Air conditioning performance of HFO-1234ze(E) + R-32 blends

| | Capacity | | | COP | | | |
|---|---|---|---|---|---|---|---|
| Fluid | Relative to 134a | Relative to 404A | Relative to 410A | Relative to 134a | Relative to 404A | Relative to 410A | GWP |
| 404A | | 1 | | | 1 | | 3784 |
| 410A | | | 1 | | | 1 | 1975 |
| HFC-134a | 1 | | | 1 | | | 1300 |
| HFO-1234ze(E) | 0.74 | 0.45 | 0.32 | 1.00 | 1.08 | 1.08 | 10 |
| 99 wt % 1234ze(E) + 1 wt % R-32 | 0.76 | 0.47 | 0.33 | 1.00 | 1.08 | 1.08 | 15 |
| 97 wt % 1234ze(E) + 3 wt % R-32 | 0.81 | 0.50 | 0.36 | 1.00 | 1.07 | 1.07 | 26 |
| 95 wt % 1234ze(E) + 5 wt % R-32 | 0.86 | 0.53 | 0.38 | 0.99 | 1.07 | 1.07 | 37 |
| 90 wt % 1234ze(E) + 10 wt % R-32 | 0.98 | 0.60 | 0.43 | 0.98 | 1.06 | 1.06 | 64 |
| 80 wt % 1234ze(E) + 20 wt % R-32 | 1.18 | 0.72 | 0.51 | 0.96 | 1.04 | 1.04 | 118 |
| 70 wt % 1234ze(E) + 30 wt % R-32 | 1.33 | 0.81 | 0.58 | 0.94 | 1.02 | 1.02 | 172 |
| 60 wt % 1234ze(E) + 40 wt % R-32 | 1.49 | 0.91 | 0.65 | 0.94 | 1.01 | 1.01 | 226 |
| 50 wt % 1234ze(E) + 50 wt % R-32 | 1.64 | 1.00 | 0.72 | 0.94 | 1.01 | 1.01 | 280 |
| 40 wt % 1234ze(E) + 60 wt % R-32 | 1.80 | 1.10 | 0.79 | 0.94 | 1.01 | 1.01 | 334 |
| 30 wt % 1234ze(E) + 70 wt % R-32 | 1.95 | 1.19 | 0.85 | 0.94 | 1.01 | 1.01 | 388 |
| 20 wt % 1234ze(E) + 80 wt % R-32 | 2.11 | 1.29 | 0.92 | 0.94 | 1.01 | 1.01 | 442 |
| 10 wt % 1234ze(E) + 90 wt % R-32 | 2.28 | 1.39 | 1.00 | 0.94 | 1.01 | 1.01 | 496 |
| R-32 | 2.47 | 1.51 | 1.08 | 0.94 | 1.01 | 1.01 | 550 |

TABLE 8B

Air conditioning performance of HFO-1234yf + R-32 blends

| | Capacity | | | COP | | | |
|---|---|---|---|---|---|---|---|
| Fluid | Relative to 134a | Relative to 404A | Relative to 410A | Relative to 134a | Relative to 404A | Relative to 410A | GWP |
| 404A | | 1 | | | 1 | | 3784 |
| 410A | | | 1 | | | 1 | 1975 |
| HFC-134a | 1 | | | 1 | | | 1300 |
| HFO-1234yf | 0.95 | 0.58 | 0.42 | 0.98 | 1.06 | 1.05 | 6 |
| 99 wt % 1234yf + 1 wt % R-32 | 0.98 | 0.60 | 0.43 | 0.98 | 1.06 | 1.05 | 11 |
| 97 wt % 1234yf + 3 wt % R-32 | 1.04 | 0.63 | 0.46 | 0.98 | 1.06 | 1.05 | 22 |
| 95 wt % 1234yf + 5 wt % R-32 | 1.09 | 0.67 | 0.48 | 0.98 | 1.06 | 1.05 | 33 |
| 90 wt % 1234yf + 10 wt % R-32 | 1.23 | 0.75 | 0.54 | 0.97 | 1.05 | 1.05 | 60 |
| 80 wt % 1234yf + 20 wt % R-32 | 1.46 | 0.89 | 0.64 | 0.96 | 1.04 | 1.04 | 115 |
| 70 wt % 1234yf + 30 wt % R-32 | 1.64 | 1.00 | 0.72 | 0.95 | 1.03 | 1.03 | 169 |
| 60 wt % 1234yf + 40 wt % R-32 | 1.80 | 1.10 | 0.79 | 0.94 | 1.02 | 1.02 | 224 |
| 50 wt % 1234yf + 50 wt % R-32 | 1.95 | 1.19 | 0.85 | 0.94 | 1.02 | 1.02 | 278 |
| 40 wt % 1234yf + 60 wt % R-32 | 2.08 | 1.27 | 0.91 | 0.94 | 1.02 | 1.02 | 332 |

TABLE 8B-continued

Air conditioning performance of HFO-1234yf + R-32 blends

| | Capacity | | | COP | | | |
|---|---|---|---|---|---|---|---|
| Fluid | Relative to 134a | Relative to 404A | Relative to 410A | Relative to 134a | Relative to 404A | Relative to 410A | GWP |
| 30 wt % 1234yf + 70 wt % R-32 | 2.19 | 1.34 | 0.96 | 0.94 | 1.02 | 1.02 | 387 |
| 20 wt % 1234yf + 80 wt % R-32 | 2.29 | 1.40 | 1.00 | 0.94 | 1.02 | 1.01 | 441 |
| 10 wt % 1234yf + 90 wt % R-32 | 2.39 | 1.46 | 1.04 | 0.94 | 1.02 | 1.01 | 496 |
| R-32 | 2.47 | 1.51 | 1.08 | 0.94 | 1.01 | 1.01 | 550 |

Example 16

Using the data in Tables 3 and 4 performance of these refrigerants in a low temperature application was evaluated. The conditions of the low temperature cycle were:
Evaporator temperature=−34° C.
Condenser temperature=45° C.
Sub-Cool=10° C.
Superheat=10° C.
Isentropic compressor efficiency=0.7

Using these conditions the capacity, COP, compressor discharge temperature and condenser and evaporator glides have been calculated and are shown in Tables 9A and 9B. The cycle performance and GWP on the mixtures was also calculated and is shown in Tables 10A and 10B. One disadvantage to using pure R-32 is the high discharge temperature. The glide of the HFO-1234ze(E)+R-32 mixtures is <9° C. over all compositions and the glide of the HFO-1234yf+R-32 mixtures is <7° C. over all compositions.

TABLE 9A

Low Temperature cycle analysis of HFO-1234ze(E) + R-32 blends

| | Pressure, psia | | Temperature, ° C. | | |
|---|---|---|---|---|---|
| Fluid | Evaporator | Condenser | Compressor Discharge | Evaporator Glide | Condenser Glide |
| 404A | 25.0 | 297.6 | 83.5 | 0.4 | 0.3 |
| 410A | 33.1 | 395.9 | 124.5 | 0.1 | 0.1 |
| HFO-1234ze(E) | 6.9 | 125.3 | 85.2 | 0.0 | 0.0 |
| 90 wt % 1234ze(E) + 10 wt % R-32 | 9.3 | 168.1 | 100.6 | 3.8 | 7.8 |
| 80 wt % 1234ze(E) + 20 wt % R-32 | 12.2 | 201.6 | 111.1 | 6.9 | 8.3 |
| 70 wt % 1234ze(E) + 30 wt % R-32 | 15.3 | 231.5 | 119.8 | 8.1 | 7.1 |
| 60 wt % 1234ze(E) + 40 wt % R-32 | 18.1 | 258.8 | 127.8 | 7.4 | 5.8 |
| 50 wt % 1234ze(E) + 50 wt % R-32 | 20.9 | 284.0 | 135.2 | 5.8 | 4.7 |
| 40 wt % 1234ze(E) + 60 wt % R-32 | 23.5 | 307.7 | 142.5 | 4.3 | 3.9 |
| 30 wt % 1234ze(E) + 70 wt % R-32 | 26.0 | 330.8 | 150.3 | 3.1 | 3.3 |
| 20 wt % 1234ze(E) + 80 wt % R-32 | 28.4 | 354.0 | 158.8 | 2.2 | 2.7 |
| 10 wt % 1234ze(E) + 90 wt % R-32 | 30.8 | 378.2 | 167.4 | 1.4 | 1.7 |
| R-32 | 33.5 | 405.4 | 175.4 | 0.0 | 0.0 |

TABLE 9B

Low Temperature cycle analysis of HFO-1234yf + R-32 blends

| | Pressure, psia | | Temperature, ° C. | | |
|---|---|---|---|---|---|
| Fluid | Evaporator | Condenser | Compressor Discharge | Evaporator Glide | Condenser Glide |
| 404A | 3.6 | 43.2 | 83.5 | 0.4 | 0.3 |
| 410A | 4.8 | 57.4 | 124.5 | 0.1 | 0.1 |
| HFO-1234yf | 12.0 | 164.5 | 72.2 | 0.0 | 0.0 |
| 90 wt % 1234yf + 10 wt % R-32 | 15.3 | 212.5 | 85.8 | 2.6 | 6.2 |
| 80 wt % 1234yf + 20 wt % R-32 | 18.7 | 250.1 | 96.2 | 4.2 | 6.6 |
| 70 wt % 1234yf + 30 wt % R-32 | 22.0 | 281.8 | 105.4 | 4.3 | 5.5 |
| 60 wt % 1234yf + 40 wt % R-32 | 24.8 | 308.9 | 114.3 | 3.5 | 4.2 |
| 50 wt % 1234yf + 50 wt % R-32 | 27.2 | 331.9 | 123.1 | 2.4 | 3.0 |
| 40 wt % 1234yf + 60 wt % R-32 | 29.2 | 351.4 | 132.4 | 1.4 | 2.1 |
| 30 wt % 1234yf + 70 wt % R-32 | 30.7 | 367.9 | 142.3 | 0.8 | 1.4 |
| 20 wt % 1234yf + 80 wt % R-32 | 31.9 | 382.2 | 152.9 | 0.4 | 0.8 |
| 10 wt % 1234yf + 90 wt % R-32 | 32.8 | 394.5 | 163.9 | 0.1 | 0.4 |
| R-32 | 33.5 | 405.4 | 175.4 | 0.0 | 0.0 |

TABLE 10A

Low Temperature performance of HFO-1234ze(E) + R-32 blends

| Fluid | Capacity Relative to 404A | Capacity Relative to 410A | COP Relative to 404A | COP Relative to 410A | GWP |
|---|---|---|---|---|---|
| 404A | 1.0 | | 1.0 | | 3784 |
| 410A | | 1.0 | | 1.0 | 1975 |
| HFO-1234ze(E) | 0.38 | 0.25 | 1.14 | 1.06 | 10 |
| 90 wt % 1234ze(E) + 10 wt % R-32 | 0.50 | 0.32 | 1.10 | 1.02 | 64 |
| 80 wt % 1234ze(E) + 20 wt % R-32 | 0.64 | 0.41 | 1.09 | 1.01 | 118 |
| 70 wt % 1234ze(E) + 30 wt % R-32 | 0.78 | 0.50 | 1.08 | 1.00 | 172 |
| 60 wt % 1234ze(E) + 40 wt % R-32 | 0.91 | 0.58 | 1.08 | 1.00 | 226 |
| 50 wt % 1234ze(E) + 50 wt % R-32 | 1.05 | 0.67 | 1.08 | 1.00 | 280 |
| 40 wt % 1234ze(E) + 60 wt % R-32 | 1.19 | 0.77 | 1.09 | 1.01 | 334 |
| 30 wt % 1234ze(E) + 70 wt % R-32 | 1.33 | 0.86 | 1.10 | 1.02 | 388 |
| 20 wt %1234ze(E) + 80 wt % R-32 | 1.48 | 0.95 | 1.11 | 1.03 | 442 |
| 10 wt % 1234ze(E) + 90 wt % R-32 | 1.62 | 1.04 | 1.11 | 1.03 | 496 |
| R-32 | 1.78 | 1.15 | 1.12 | 1.04 | 550 |

TABLE 10B

Low Temperature performance of HFO-1234yf + R-32 blends

| Fluid | Capacity Relative to 404A | Capacity Relative to 410A | COP Relative to 404A | COP Relative to 410A | GWP |
|---|---|---|---|---|---|
| 404A | 1.0 | | 1.0 | | 3784 |
| 410A | | 1.0 | | 1.0 | 1975 |
| HFO-1234yf | 0.54 | 0.35 | 1.07 | 0.99 | 6 |
| 90 wt % 1234yf + 10 wt % R-32 | 0.71 | 0.46 | 1.08 | 1.00 | 60 |
| 80 wt % 1234yf + 20 wt % R-32 | 0.88 | 0.56 | 1.09 | 1.01 | 115 |
| 70 wt % 1234yf + 30 wt % R-32 | 1.04 | 0.67 | 1.09 | 1.01 | 169 |
| 60 wt % 1234yf + 40 wt % R-32 | 1.18 | 0.76 | 1.10 | 1.02 | 224 |
| 50 wt % 1234yf + 50 wt % R-32 | 1.32 | 0.85 | 1.11 | 1.03 | 278 |
| 40 wt % 1234yf + 60 wt % R-32 | 1.44 | 0.92 | 1.11 | 1.03 | 332 |
| 30 wt % 1234yf + 70 wt % R-32 | 1.54 | 0.99 | 1.12 | 1.04 | 387 |
| 20 wt % 1234yf + 80 wt % R-32 | 1.63 | 1.05 | 1.12 | 1.04 | 441 |
| 10 wt % 1234yf + 90 wt % R-32 | 1.71 | 1.10 | 1.12 | 1.04 | 496 |
| R-32 | 1.78 | 1.15 | 1.12 | 1.04 | 550 |

Those skilled in the art will appreciate that the foregoing description and examples are intended to be illustrative of the invention but not necessarily limiting of the full and true broad scope of the invention, which will be represented by the appended claims as presented now or hereinafter.

What is claimed is:

1. A method of cooling to provide refrigeration comprising:
   (a) providing an R404A low temperature refrigeration system or an R404A medium temperature refrigeration system comprising an evaporator; and
   (b) evaporating in said evaporator a refrigerant consisting essentially of:
      (i) from 20% to 30% by weight of R-32; and
      (ii) from 70% to 80% by weight of 1234yf,
   wherein said refrigerant has: (1) a GWP of 150 or less; and (2) a temperature glide in said evaporator of about 7° C. or less, and wherein said system with said refrigerant has a capacity of from about 85% to less than 110% relative to the capacity of the system operating with R-404A.

2. The method of claim 1 wherein said providing step comprises providing, with or without modification, a low temperature refrigeration system designed for use with R404A.

3. The method of claim 1 wherein said providing step comprises providing a low temperature refrigeration system and wherein said refrigerant has a temperature glide in said evaporator of about 5° C. or less.

4. The method of claim 3 wherein said low temperature refrigeration system with said refrigerant operates with a capacity of about 88% to about 104% relative to the capacity of said system operating with R404A.

5. The method of claim 3 wherein said providing step comprises providing a low temperature refrigeration system and wherein said low temperature refrigeration system with said refrigerant operates with a COP of about 109% relative to the COP of said system operating with R404A.

6. The method of claim 4 wherein said providing step comprises providing a low temperature refrigeration system and wherein said low temperature refrigeration system with said refrigerant operates with a COP of about 109% relative to the COP of said system operating with R404A.

7. The method of claim 1 wherein said providing step comprises providing, with or without modification, a medium temperature refrigeration system designed for use with R404A.

8. The method of claim 1 wherein said providing step comprises providing a medium temperature refrigeration system.

9. The method of claim 1 wherein said refrigerant consists essentially of:
   (i) about 20% by weight of difluoromethane (R-32); and
   (ii) about 80% weight percent of 1,1,1,2-tetrafluoropropene (HFO-1234yf).

10. The method of claim 9 wherein said providing step comprises providing, with or without modification, a low temperature refrigeration system designed for use with R404A.

11. The method of claim 9 wherein said providing step comprises providing a low temperature refrigeration system.

12. The method of claim 11 wherein said low temperature refrigeration system with said refrigerant operates with a capacity of about 88% relative to the capacity of said system operating with R404A.

13. The method of claim 11 wherein said low temperature refrigeration system with said refrigerant operates with a COP of about 109% relative to the COP of said system operating with R404A.

14. The method of claim 12 wherein said low temperature refrigeration system with said refrigerant operates with a COP of about 109% relative to the COP of said system operating with R404A.

15. The method of claim 9 wherein said providing step comprises providing, with or without modification, a medium temperature refrigeration system designed for use with R404A.

16. The method of claim 9 wherein said providing step comprises providing a medium temperature refrigeration system.

17. A system to replace R404A in a low temperature refrigeration system or in a medium temperature refrigeration system comprising:
(a) providing an R404A low temperature refrigeration system or an R404A medium temperature refrigeration system comprising a compressor, a condenser and an evaporator; and
(b) said low temperature refrigeration system or said medium temperature refrigeration system comprising a refrigerant consisting essentially of:
(i) from 20% to 30% by weight of R-32; and
(ii) from 70% to 80% by weight of 1234yf,
wherein said refrigerant has: (1) a GWP of 150 or less; and (2) a temperature glide in said evaporator of about 7° C. or less, and wherein said system with said refrigerant has a capacity of from about 85% to less than 110% relative to the capacity the system operating with R-404A.

18. The system of claim 17 wherein said system is a low temperature refrigeration system designed for use with R404A or a medium temperature refrigeration system designed for use with R404A.

19. The system of claim 17 wherein said system is a low temperature refrigeration system which is designed for use with R404A and which is modified.

20. The system of claim 17 wherein said system is a low temperature refrigeration system which is designed for use with R404A and which is not modified.

21. The system of claim 19 wherein said system with said refrigerant operates with a capacity of about 88% to about 104% relative to the capacity of said system operating with R404A.

22. The system of claim 19 wherein said system with said refrigerant operates with a COP of about 109% relative to the COP of said system operating with R404A.

23. The system of claim 21 wherein said system with said refrigerant operates with a COP of about 109% relative to the COP of said system operating with R404A.

24. The system of claim 17 wherein said system is a medium temperature refrigeration system.

25. The system of claim 19 wherein said refrigerant consists essentially of:
(i) about 20% by weight of difluoromethane (R-32); and
(ii) about 80% weight percent of 1,1,1,2-tetrafluoropropene (HFO-1234yf).

26. The system of claim 25 wherein said system is a low temperature refrigeration system.

27. The system of claim 26 wherein said system with said refrigerant operates with a capacity of about 88% relative to the capacity of said system operating with R404A.

28. The system of claim 27 wherein said system with said refrigerant operates with a COP of about 109% relative to the COP of said system operating with R404A.

29. The system of claim 26 wherein said system with said refrigerant operates with a COP of about 109% relative to the COP of said system operating with R404A.

30. The system of claim 24 wherein said system is a medium temperature refrigeration system designed for use with R404A.

* * * * *